(12) United States Patent
Seki et al.

(10) Patent No.: US 8,915,649 B2
(45) Date of Patent: Dec. 23, 2014

(54) WHEEL BEARING APPARATUS

(71) Applicant: NTN Corporation, Osaka-shi (JP)

(72) Inventors: Makoto Seki, Iwata (JP); Yasuhiro Aritake, Iwata (JP); Tomoko Baba, Iwata (JP); Tadashi Mitsuishi, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/020,819

(22) Filed: Sep. 7, 2013

(65) Prior Publication Data
US 2014/0010487 A1 Jan. 9, 2014

Related U.S. Application Data

(63) Continuation of application No. PCT/JP2012/055954, filed on Mar. 8, 2012.

(30) Foreign Application Priority Data

Mar. 9, 2011 (JP) .................................. 2011-051406
Jul. 28, 2011 (JP) .................................. 2011-165061

(51) Int. Cl.
| F16C 13/00 | (2006.01) |
| F16C 33/76 | (2006.01) |
| F16C 41/00 | (2006.01) |
| F16C 43/04 | (2006.01) |
| B60B 7/00 | (2006.01) |
| F16C 33/72 | (2006.01) |
| B60B 27/00 | (2006.01) |
| F16C 19/18 | (2006.01) |

(52) U.S. Cl.
CPC ............. *B60B 27/0005* (2013.01); *F16C 33/76* (2013.01); *F16C 41/007* (2013.01); *B60B 27/00* (2013.01); *F16C 2326/02* (2013.01); *F16C 19/186* (2013.01); *F16C 43/045* (2013.01); *B60B 27/0073* (2013.01); *B60B 7/0013* (2013.01); *F16C 33/768* (2013.01); *F16C 33/723* (2013.01)
USPC ............ 384/489; 384/448; 384/544; 384/589

(58) Field of Classification Search
CPC ............................. F16C 33/723; F16C 41/007
USPC .................................. 384/448, 489, 544, 589
See application file for complete search history.

(56) References Cited

U.S. PATENT DOCUMENTS 6,481,896 B1 11/2002 Ohtsuki et al.
2010/0054644 A1 3/2010 Takada

FOREIGN PATENT DOCUMENTS

| JP | 2000-249138 A | 9/2000 |
| JP | 2001-065704 A | 3/2001 |

(Continued)

*Primary Examiner* — Phillip A Johnson
(74) *Attorney, Agent, or Firm* — Harness, Dickey & Pierce, P.L.C.

(57) ABSTRACT

A wheel bearing apparatus has a protecting cover formed from non-magnetic steel sheet with a cup-shaped configuration. The protective cover has a cylindrical fitting portion, a disk-shaped shield portion, a radially reducing portion, a stepped portion and a bottom portion. The cylindrical fitting portion is press-fit into the inner circumference of the inner-side end of the outer member. The disk-shaped shielding portion extends radially inward from the fitting portion, via the radially reducing portion. The inner-side surface of the shielding portion is arranged close to or in contact with a rotation speed detecting sensor. The bottom portion is continuous with the shielding portion, via the stepped portion to close the inner-side end of the inner member. A full deflection of the side surface of the shielding portion that is caused by a load the same as that applied to the protecting cover when it is press-fit into the outer member is limited to a predetermined value or less.

30 Claims, 17 Drawing Sheets

(56) References Cited

FOREIGN PATENT DOCUMENTS

| | | |
|---|---|---|
| JP | 2006-349009 A | 12/2006 |
| JP | 2007-001341 A | 1/2007 |
| JP | 2008-164083 A | 7/2008 |
| JP | 2010-106909 A | 5/2010 |
| JP | 2010-151279 A | 7/2010 |
| JP | 2010-180912 A | 8/2010 |
| JP | 2010-190421 A | 9/2010 |
| JP | 2011-117583 A | 6/2011 |
| JP | 2012-167821 A | 9/2012 |
| JP | 2012-255455 A | 12/2012 |
| WO | WO-2010-050201 A1 | 5/2010 |

(a)    (b)

Fig 11
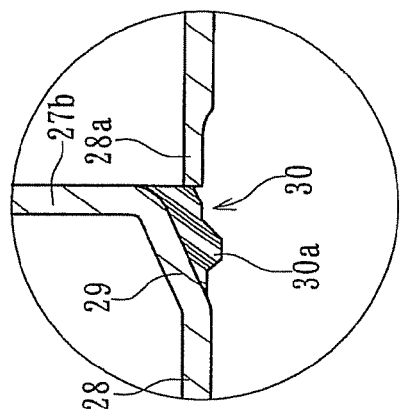
(c)
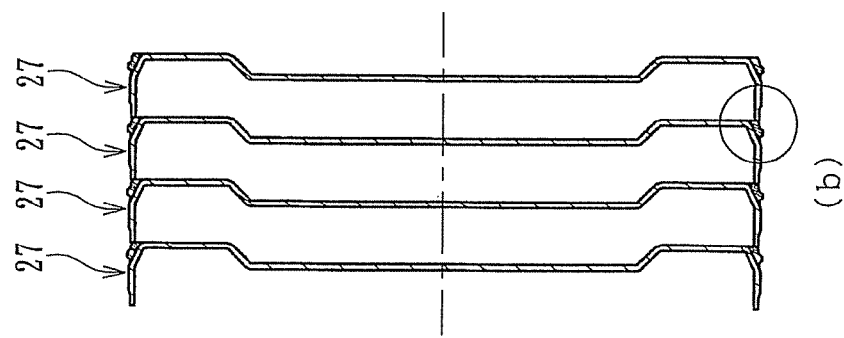
(b)
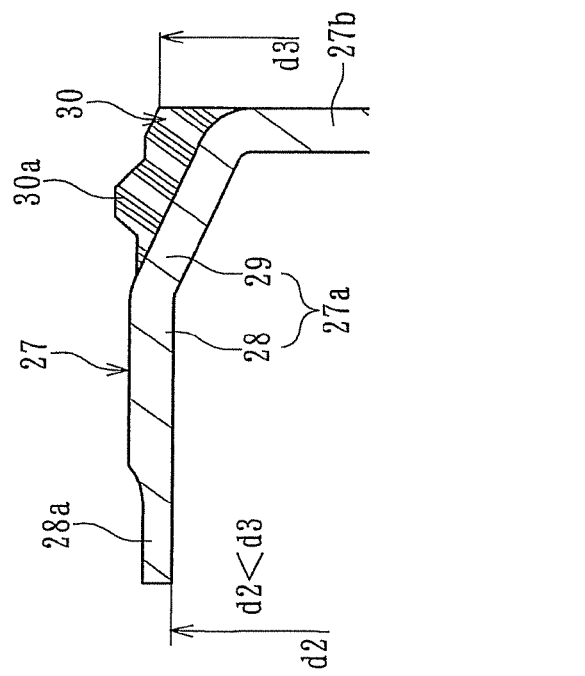
(a)

Fig 12
(a)
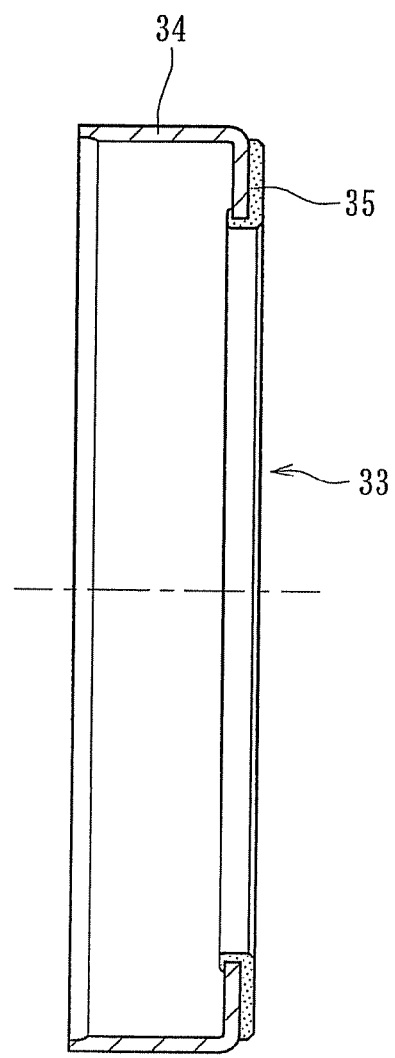
(b)
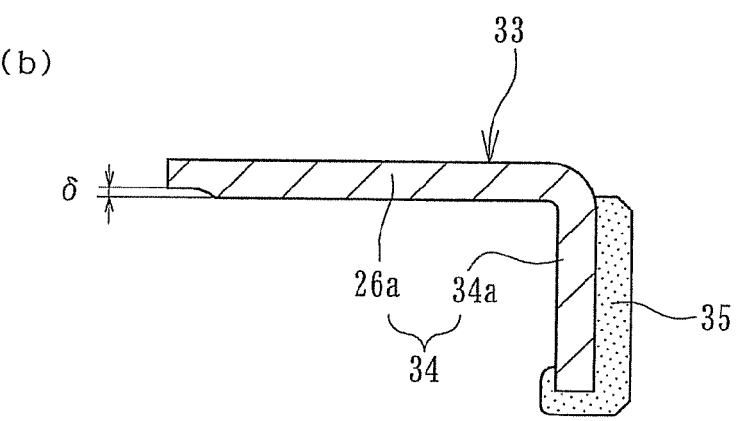

Fig 14
(a)
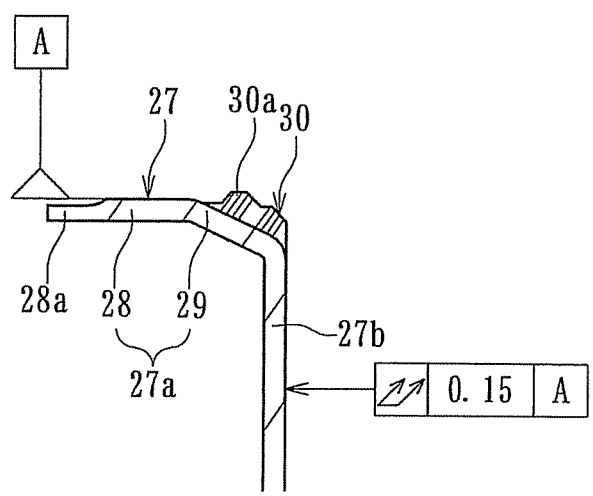
(b)
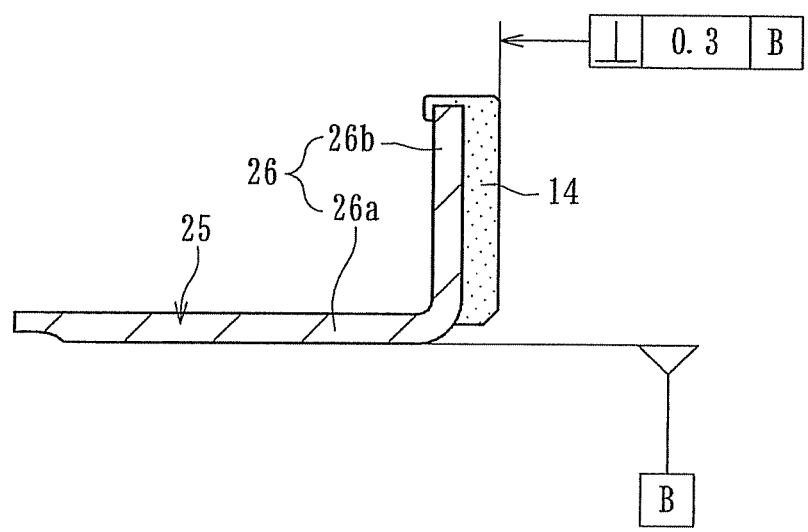

PRIOR ART

PRIOR ART (a)　　　　　　　　　(b)

WHEEL BEARING APPARATUS

CROSS-REFERENCE TO RELATED APPLICATIONS

This application is a continuation of International Application No. PCT/JP2012/055954, filed Mar. 8, 2012, which claims priority to Japanese Application Nos. 2011-051406 filed Mar. 9, 2011, and 2011-165061 filed Jul. 28, 2011. The disclosures of the above applications are incorporating herein by reference.

FIELD

The present disclosure generally relates to a wheel bearing apparatus that can rotationally support a vehicle wheel, such as an automobile, and is provided with a protecting cover to seal the inside of the bearing from the outside.

BACKGROUND

It is generally known that a wheel bearing apparatus can support a vehicle wheel with respect to a suspension apparatus. Also, an incorporated rotational speed detecting apparatus detects a rotation speed of the vehicle wheel of vehicle to control the anti-lock braking system (ABS). Such a bearing apparatus generally includes a sealing apparatus arranged between the inner and outer members that rotate relative to each other via rolling elements contained between them. The sealing apparatus is integrally formed with a magnetic encoder, that has magnetic poles alternately arranged along its circumference. A rotational speed sensor detects changes of the magnetic poles of the magnetic encoder caused by the rotation of the wheel. The rotational speed sensor is adapted to be mounted on a knuckle, forming part of a suspension apparatus, after the wheel bearing apparatus has been mounted on the knuckle.

A known structure is shown in FIG. 18 as one example of a wheel bearing apparatus. This wheel bearing apparatus has an outer member 50, an inner member 51, and a plurality of balls 52 contained between the outer member 50 and the inner member 51. The inner member 51 includes a wheel hub 53 and an inner ring 54 fit onto the wheel hub 53.

The outer member 50 has, on its outer circumference, an integrally formed body mounting flange 50b. The outer member inner circumference includes double row outer raceway surfaces 50a, 50a. A sensor 63 is secured on the knuckle 65 via a bolt 66.

The wheel hub 53 is integrally formed with a wheel mounting flange 55 to mount a wheel (not shown) on one end. The wheel hub 53 has an inner raceway surface 53a and a cylindrical portion 53b axially extending from the inner raceway surface 53a. An inner ring 54, with an inner raceway surface 54a formed on its outer circumference, is axially immovably secured to the wheel hub 53 by a caulked portion 53c formed by plastically deforming the end of the cylindrical portion 53b.

A sealing ring 56 is fit into the outer end of the outer member 50. A lip of the sealing ring 56 slidably contacts a base portion 55a of the wheel mounting flange 55. On the other hand, an encoder 57 is mounted on the inner end outer circumference of the inner ring 54. The encoder 57 has an annular supporting member 58, with an L-shaped longitudinal section, and a ring-shaped encoder body 59 adhered to the side of the annular supporting member 58 along its entire periphery. The encoder body 59 has N and S poles alternately arranged along its circumference.

The inner end opening of the outer member 50 is closed by a cover 60. The cover 60 is formed of non-magnetic sheet material such as non-magnetic stainless steel sheet, aluminum alloy sheet or high functional polymer, etc. It has a dish-shaped configuration with a disk-shaped closing plate portion 61 and a cylindrical fitting portion 62 formed around a periphery of the closing plate portion 61.

The side face of the encoder body 59, forming the encoder 57, is arranged opposite and close to the cover 60. The detecting portion 64 of the sensor 63 is arranged close to or abutting against the side of the cover 60. Thus, the detecting portion 64 is arranged opposite and close to the encoder body 59 via the cover 60. Accordingly, the presence of the cover 60 prevents the entry of water, iron powder or magnetized debris, etc. into the space between the sensor 63 and the encoder 57. Thus, this prevents damage to the sensor 63 and the encoder 57, as well as cyclic interfere or deterioration of the magnetic properties of the encoder body 59 (see, e.g. JP2000-249138A and JP2007-1341A).

Low cost production and reduction of weight and size for fuel saving consumption of the wheel bearing apparatus has been promoted. In such a wheel bearing apparatus, a wheel hub and a double row rolling bearing are united, a representative example is shown in FIG. 20.

This wheel bearing apparatus has an outer member 70, a pair of inner rings 71, 71, and a plurality of balls 72 contained between the outer member 70 and the inner rings 71, 71. The outer member 70 has, on its outer circumference, an integrally formed wheel mounting flange 73. Its inner circumference has double row outer raceway surfaces 70a, 70a.

The pair of inner rings 71, 71 are fit onto an axle shaft 74 via a clearance fitting and axially secured by a securing nut 75. A shield 76 and a seal 77 are mounted in annular openings formed between the outer member 70 and the inner rings 71, 71. They prevent leakage of lubricating grease sealed within the bearing and the entry of rain water or dust from the outside into the bearing. The shield 76 forms a labyrinth seal cooperating with the inner ring 71 to prevent the flowing out of lubricating grease.

The outer member 70 is formed with a brake pilot 78 and a wheel pilot 79 axially extending from the wheel mounting flange 73. The brake pilot 78 is formed as a cylindrical projection coaxial with the outer member 70. The wheel pilot 79 is formed with a diameter slightly smaller than that of the brake pilot 78 and split circumferentially into several parts.

A cap 80, formed of steel sheet having corrosion resistance, is press worked into a cup-shaped configuration. As shown in FIG. 21(a), the cap 80 has a cylindrical portion 80a, an overlapped portion 80b, and a bottom portion 80c. The overlapped portion 80b projects radially outward from the cylindrical portion 80a. The bottom portion 80c continuously extends from the overlapped portion 80b.

In addition, the cap 80 is formed with a plurality of claws 81 along the circumference of the cylindrical portion 80a. Each claw 81 is raked radially outward by a slight angle. An annular groove 82 is formed on an inner circumference of the brake pilot 78, as shown in FIG. 22. The cap 80 can be securely fitted onto the outer member 70 by press-fitting the cap 80 into the opening of the outer member 70 until the overlapped portion 80b abuts against the end face of the pilot 79, due to spring-back engagement of claws 81 with the annular groove 82. Thus, the circumferential inner surface of the pilots 78, 79 can be prevented from corrosion (see, JP 2000-249138A and JP 2007-1341A).

However, problems exist in these wheel bearing apparatus of the prior art. First of all, in the former wheel bearing apparatus, since the cover 60 is secured on the outer member 50, via metal-to-metal fitting, it is impossible to have sufficient sealability in the fitting portion without improving the accuracy and roughness of the fitting surfaces.

In addition, since the cover 60 has a simple "C"-shaped longitudinal section, the rigidity of the cover 60 is insufficient. Thus, the cover 60 is deformed by impingement of pebbles and is caused to contact with the encoder body 59.

Furthermore, since the detecting portion 64 of the sensor 63 opposes the encoder 57 via the cover 60, it is necessary to take into consideration not only the sheet thickness of the cover 60 but air gaps between the encoder 57 and the cover 60 as well as the cover 60 and the sensor 63. This causes an increase of the air gap between the encoder 57 and the sensor 63 and thus reduction of the sensitivity of the sensor 63 and the detection accuracy.

In addition, the cover closing plate portion 61 sometimes deforms by the press-fitting interference between the cover 60 and the outer member 50, as shown by two dotted lines in FIG. 19. In such a case, it is necessary to previously consider the amount of deformation of the cover 60 and to set a large initial air gap in order to avoid interference between associated parts.

In the latter wheel bearing apparatus of the prior art, with the split-type pilot portions 78, 79, it is possible to prevent the inside of the bearing from getting rusty as well as to inhibit the rust invasion into the pilot portions 78, 79, by securely fixing the cap 80 onto the outer member 70. The cap 80 is press fit into the split-type pilot portions 78, 79. The cap 80 is formed of steel sheet by press-working. Thus, it is difficult to have high accuracy dimensions and roundness of the cylindrical portion 80a. Accordingly, the interference of the cylindrical portion 80a is usually set large such as a range within 0.1~0.4 mm to prevent movement and slip-off of the cap 80.

Furthermore, if a width "A" (FIG. 22) of a guiding portion 83 of the pilot portions 78, 79 is insufficient in addition to the large interference of the cylindrical portion 80a, the cap 80 can sometimes be press-fit into the pilot portions 78, 79 under an inclined condition. This causes linear damage or scratches 84 (FIG. 21(b)) on the cylindrical portion 80a of the cap 80 during press-fitting. Thus, it is believed that sealability of the cap 80 is detracted by the damage or scratches 84 and accordingly the life of the wheel bearing apparatus would be reduced by generation of corrosion due to the entry of rain or muddy water through the fitting portion.

SUMMARY

It is, therefore, an object of the present disclosure to provide a wheel bearing apparatus that can solve the problems of prior art described above. Thus, it can protect the magnetic encoder by improving the sealability of the fitting portion between the protecting cover and the outer member. Also, it can improve the accuracy and reliability of rotation speed detection by considering the deformation of the protecting cover and limiting the increase of the air gap.

It is another object of the present disclosure to provide a wheel bearing apparatus that can improve the sealability of the fitting portion by preventing the generation of damage or scratches during the press-fitting operation. Also, it can improve the workability during press-fitting by presetting the protecting cover prior to press-fitting.

According to the present disclosure, a wheel bearing apparatus comprises an outer member and an inner member. The outer member is integrally formed, on its inner circumference, with double row outer raceway surfaces. The inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The wheel hub and the inner ring are formed on their outer circumferences, respectively, with double row inner raceway surfaces. The inner raceway surfaces oppose the double row outer raceway surfaces. Double row rolling elements are freely rollably contained between the inner raceway surfaces and outer raceway surfaces of the inner member and outer member. A pulser ring is fit onto the outer circumference of the inner ring. A seal is mounted on the outer-side end of the outer member. A protecting cover is mounted on the inner-side end of the outer member. The seal and cover close and seal annular openings formed between the outer member and the inner member at both their ends. The protecting cover is formed of non-magnetic steel sheet with a cup-shaped configuration by press working. The cover includes a cylindrical fitting portion press-fit into the inner circumference of the inner-side end of the outer member. A disk-shaped shielding portion extends radially inward from the fitting portion, via a radially reducing portion. The inner-side surface of the shielding portion is adapted to be arranged close to or contact a rotation speed detecting sensor. A bottom portion is continuous with the shielding portion, via a stepped portion, to close the inner-side end of the inner member. A full deflection of the side surface of the shielding portion caused by a load on the same, as that applied to the protecting cover when it is press-fit into the outer member, is limited to a predetermined value or less.

The protecting cover is formed from non-magnetic steel sheet with a cup-shaped configuration by press working. A cylindrical fitting portion is press-fit into the inner circumference of the inner-side end of the outer member. A disk-shaped shielding portion extends radially inward from the fitting portion via a radially reducing portion. The inner-side surface of the shielding portion is adapted to be arranged closely to or in contact with a rotation speed detecting sensor. A bottom portion is continuous with the shielding portion via a stepped portion to close the inner-side end of the inner member. A full deflection of the side surface of the shielding portion, caused by a load of the same as that applied to the protecting cover when it is press-fit into the outer member, is limited to a predetermined value or less. Thus, it is possible to increase the rigidity of the protecting cover by providing the stepped longitudinal section on the protecting cover. Thus, this suppresses deformation of the protecting cover due to impingement by pebble, etc. Also, it improves the accuracy and reliability of rotation speed detection by considering the deformation of the protecting cover and limiting the increase of the air gap.

The allowable limitation of the full deflection of the shielding portion of the protecting cover is 0.15 mm or less. Thus, it is possible to set a minimum air gap and to further improve the detection accuracy.

The shielding portion of the protecting cover is formed so that it is inclined toward the outer-side by a predetermined inclined angle. Thus, it is possible to assure a desirable geometrical accuracy even if the shielding portion is bulged toward the inner-side by the press-fitting interference relative to the outer member when the protecting cover is press-fit into the outer member.

The radially reducing portion of the protecting cover may be a stepped configuration in its longitudinal section. The radially reducing portion of the protecting cover may be tapered so that its radius is gradually reduced toward the inner-side direction.

A sealing member is integrally adhered to the outer circumference of the radially reducing portion of the protecting cover. The sealing member includes an annular portion and a projected portion. The annular portion has an outer diameter slightly smaller than an outer diameter of the fitting portion of the protecting cover. The projected portion has an outer diameter larger than that of the fitting portion. The projected portion is press-fit into the inner circumference of the end of the outer member via a predetermined interference. Thus, it is possible to improve the sealability of the fitting surfaces of the outer member and the protecting cover.

The dimension of the sealing member is set so that it does not project beyond the inner-side surface of the shielding portion of the protecting cover. Thus, it is unnecessary to separate the rotation speed detecting sensor from the magnetic encoder a distance more than necessary. Thus, it is possible to set a minimum air gap to improve the detecting accuracy.

The fitting volume of the projected portion of the sealing member is set so that it is smaller than a volume of an annular space formed between the annular portion of the sealing member and the inner circumference of the outer member under a condition where a press-fit tool abuts against the sealing member. Thus, it is possible to prevent the sealing member from being damaged even if the projected portion of the sealing member is bulged by compression. The annular portion of the sealing member allows escaping space for the projected portion of the sealing member.

The inner diameter of the end of the fitting portion of the protecting cover is set so that it is smaller than the outer diameter of the inner-side end surface of the sealing member. Thus, it is possible to have the sealing member surely abut by the end of the fitting portion of the protecting cover. This forms a nest for the protecting covers which improves the workability during the manufacturing step.

A sheet thickness of the shielding portion of the protecting cover is smaller than a sheet thickness of the other portions. Thus, it is possible to set a minimum air gap between the detecting portion of the sensor and the magnetic encoder to improve the detecting accuracy.

A stepped portion recessed from the shielding portion is formed between the shielding portion and the radially reducing portion of the protecting cover. Thus, it is possible to assure desirable detecting accuracy since the bulged out sealing member does not give any influence to the shielding portion against which the rotation speed detecting sensor abuts or is closely arranged.

A thinned portion is formed between the shielding portion and radial reducing portion of the protecting cover. Thus, it is possible to set a minimum air gap between the rotation speed detecting sensor and the magnetic encoder to improve the detecting accuracy.

An inner-side end surface of the outer member is slightly projected from a large end surface of the inner ring toward the inner-side. Thus, it is possible to prevent the protecting cover from abutting against the inner ring.

The magnetic encoder is arranged so that its detecting surface is substantially flush with the large end surface of the inner ring or it is slightly projected from the large end surface of the inner ring toward the inner-side. Thus, it is possible to achieve easy adjustment of the air gap and to set the air gap as small as possible.

Adhesive or liquid sealant is applied on the fitting portion of the protecting cover. Thus, it is possible to improve the sealability of the fitting portions between the protecting cover and the outer member without strictly limiting the dimensional accuracy of the protecting cover and the outer member.

The sealing member is formed of rubber material with the compression set of physical properties of rubber of 40% or less at 120° C.×70 hours and the TR10 value of −35° C. or less. Strain recovering ability of the sealing member can be remarkably improved and thus desirable sealing performance can be maintained.

Either one of fitting surfaces of the protecting cover and the outer member is formed with a step in a radial direction. Thus, it is possible to preset the protecting cover under a coaxially aligned condition when the protecting cover is press-fit into the outer member. Also, it is possible to provide a wheel bearing apparatus that can improve the sealability of the fitting portion while preventing the generation of damage or scratches during the press-fitting operation. Also, it can improve the workability during press-fitting operation.

It is preferable that the height of the step may be within a range of 0.15~0.30 mm. This forms a preferable guiding gap during press-fitting of the protecting cover. Thus, this improves the workability of the press-fitting operation.

It is preferable that the step may be formed on the end of the fitting portion of the protecting cover by a press work. The outer diameter of the step may be smaller than the inner diameter of the fitting surface of the outer member.

The end of the fitting portion is formed as a small diameter portion having a diameter smaller than the outer diameter of the fitting portion by the height of the step. Thus, it is possible to preset the protecting cover under a coaxially aligned condition of the protecting cover when the protecting cover is press-fit into the outer member. Thus, this improves the workability during the press-fitting operation.

A width of the step of the protecting cover is larger than a width of a chamfered portion end of the outer member. Thus, it is possible to preset the protecting cover under an attitude controlled condition of the protecting cover when the protecting cover is press-fit into the outer member. Thus, this further improves the workability during the press-fitting operation.

It is preferable that a guiding portion is formed on the inner circumference of the end of the outer member. An inner diameter of the guiding portion may be larger than an outer diameter of the fitting portion of the protecting cover.

A transition portion between the fitting surface and the guiding portion of the outer member is formed with a circular-arc longitudinal section having a predetermined radius of curvature. The outer raceway surfaces, fitting surface and transitional portion are simultaneously ground by a formed grinding wheel. Thus, it is possible to improve the dimensional accuracy and coaxiality of the protecting cover and the outer member. This further improves the workability during the press-fitting operation of the protecting cover.

The pulser ring is formed by press work from a steel sheet. It has a cylindrical fitting portion, an annular supporting member and magnetic encoder. The cylindrical fitting portion is press-fit onto the outer circumference of the inner ring. The magnetic encoder is formed from an elastomer with mingled ferritic magnetic powder so that N and S poles are alternately arranged along its circumference. The magnetic encoder is arranged to oppose the rotation speed detecting sensor, via a predetermined axial gap through the protecting cover. Either one of fitting surfaces of the annular supporting member and the inner ring is formed with a step in a radial direction. Thus, it is possible to preset the pulser ring under a coaxially aligned condition when the pulser ring is press-fit onto the inner ring. Thus, it is possible to improve the sealability of the fitting portion while preventing the generation of damage or scratches during the press-fitting operation of the pulser ring and to improve the workability during the press-fitting operation.

The step may be formed on the end of the fitting portion of the annular supporting member by a press work. The inner diameter of the step may be larger than the outer diameter of the inner ring.

A width of the step of the annular supporting member is larger than a width of the chamfered portion. Thus, it is possible to preset the pulser ring under an attitude controlled condition of the pulser ring when the pulser ring is press-fit onto the inner member. This further improves the workability during the press-fitting operation of the pulser ring.

The perpendicularity of the magnetic encoder relative to the fitting portion of the annular supporting member is limited to 0.30 mm or less. Thus, it is possible to preset the pulser ring under an attitude controlled condition of the pulser ring when the pulser ring is press-fit onto the inner member.

A guiding portion is formed on the outer circumference of the end of the inner ring. An outer diameter of the guiding portion is larger than an outer diameter of the inner ring. Thus, it is possible to preset the pulser ring under a coaxially aligned condition when the pulser ring is press-fit onto the inner ring. Thus, it is possible to improve the sealability of the fitting portion by preventing the generation of damage or scratches during the press-fitting operation of the pulser ring and to improve the workability during the press-fitting operation.

An outer diameter of the fitting portion of the annular supporting member is larger than an inner diameter of the magnetic encoder. Thus, it is possible to have the magnetic encoder to surely abut the end of the fitting portion of the annular supporting member. This forms a nest of the magnetic encoders that improves the workability during the manufacturing step.

A transition portion between the outer circumference of the inner ring and the guiding portion of the inner ring is formed with a circular-arc longitudinal section having a predetermined radius of curvature. The inner raceway surface of the inner ring, outer circumference and transitional portion are simultaneously ground by a formed grinding wheel. Thus, it is possible to improve the dimensional accuracy and coaxiality of the pulser ring and the inner ring. This further improves the workability of the press-fitting operation of the pulser ring.

In the present disclosure, the wheel bearing apparatus comprises an outer member integrally formed, on its inner circumference, with double row outer raceway surfaces. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The wheel hub and the inner ring are formed, on their outer circumferences, respectively, with double row inner raceway surfaces that oppose the double row outer raceway surfaces. Double row rolling elements are freely rollably contained between the inner raceway surfaces and outer raceway surfaces of the inner member and outer member. A pulser ring is fit onto the outer circumference of the inner ring. A seal is mounted on the outer-side end of the outer member. A protecting cover is mounted on the inner-side end of the outer member. The seal and cover close and seal annular openings formed between the outer member and the inner member at both their ends. The protecting cover is formed with a cup-shaped configuration by press working a non-magnetic steel sheet. A cylindrical fitting portion is press-fit into the inner circumference of the inner-side end of the outer member. A disk-shaped shielding portion extends radially inward from the fitting portion, via a radially reducing portion. The inner-side surface of the shielding portion is adapted to be arranged close to or in contact with a rotation speed detecting sensor. A bottom portion is continuous with the shielding portion via a stepped portion to close the inner-side end of the inner member. A full deflection of the side surface of the shielding portion caused by a load, same as that applied to the protecting cover when it is press-fit into the outer member, is limited to a predetermined value or less. Thus, it is possible to increase the rigidity of the protecting cover by providing the stepped longitudinal section on the protecting cover. Also, this suppresses deformation of the protecting cover due to impingement of pebble, etc. Additionally, it improves the accuracy and reliability of rotation speed detection while considering the deformation of the protecting cover and limiting the increase of air gap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11(a) is a partially enlarged sectional view of the protecting cover of FIG. 8;

FIG. 11(b) is an explanatory view of nesting of the protecting cover;

FIG. 11(c) is a partially enlarged view of FIG. 11(b);

FIG. 12(a) is a longitudinal sectional view of a modification of the pulser ring of FIG. 8;

FIG. 12(b) is a partially enlarged sectional view of FIG. 8(a);

FIG. 14(a) is an explanatory view of the accuracy of the protecting cover of FIG. 8;

FIG. 14(*b*) is an explanatory view of the accuracy of the pulser ring of FIG. 8;

FIG. 16(*b*) is an explanatory view of a preset of the pulser ring of FIG. 15;

FIG. 17(*b*) is an explanatory view of a method for processing the inner ring of FIG. 15;

FIG. 21(*b*) is a side elevation view of the cap after being press-fit; and

DETAILED DESCRIPTION

A preferable mode for carrying out the present disclosure is a wheel bearing apparatus including an outer member integrally formed with a body mounting flange on its outer circumference. The integrally formed body mounting flange is to be mounted on a knuckle. The outer member inner circumference has double row outer raceway surfaces. An inner member includes a wheel hub and an inner ring. The wheel hub is integrally formed, on its one end, with a wheel mounting flange. A cylindrical portion axially extends from the wheel mounting flange. The inner ring is press fit onto the cylindrical portion of the wheel hub. The wheel hub and the inner ring are formed, on their outer circumferences, respectively, with one of the double row inner raceway surfaces that oppose the double row outer raceway surfaces. Double row rolling elements are freely rollably contained between the inner raceway surfaces and outer raceway surfaces of the inner member and outer member. A magnetic encoder is fit onto the outer circumference of the inner ring. The inner ring is axially secured on the cylindrical portion of the wheel hub by a caulked portion. The caulked portion is formed by plastically deforming the end of the cylindrical portion under a condition applying a bearing pre-pressure. A seal is mounted on the outer-side end of the outer member. A protecting cover is mounted on the inner-side end of the outer member. The cover and seal close and seal annular openings formed between the outer member and the inner member at both their ends. The protecting cover is formed by press working a non-magnetic austenitic stainless steel sheet into a cup-shaped configuration. A cylindrical fitting portion is press-fit into the inner circumference of the inner-side end of the outer member. The cover has a cylindrical portion, a disk-shaped shielding portion, a radially reducing portion and a bottom portion. The disk-shaped shielding portion extends radially inward from the fitting portion, via a radially reducing portion. The inner-side surface of the shielding portion is adapted to be arranged close to or in contact with a rotation speed detecting sensor. The bottom portion is continuous with the shielding portion via a stepped portion to close the inner-side end of the inner member. The shielding portion of the protecting cover is formed so that it is inclined toward the outer-side by a predetermined inclined angle. A full deflection of the side surface of the shielding portion, caused by a load of the same as that applied to the protecting cover when it is press-fit into the outer member, is limited to 0.15 mm or less.

Figure 1:
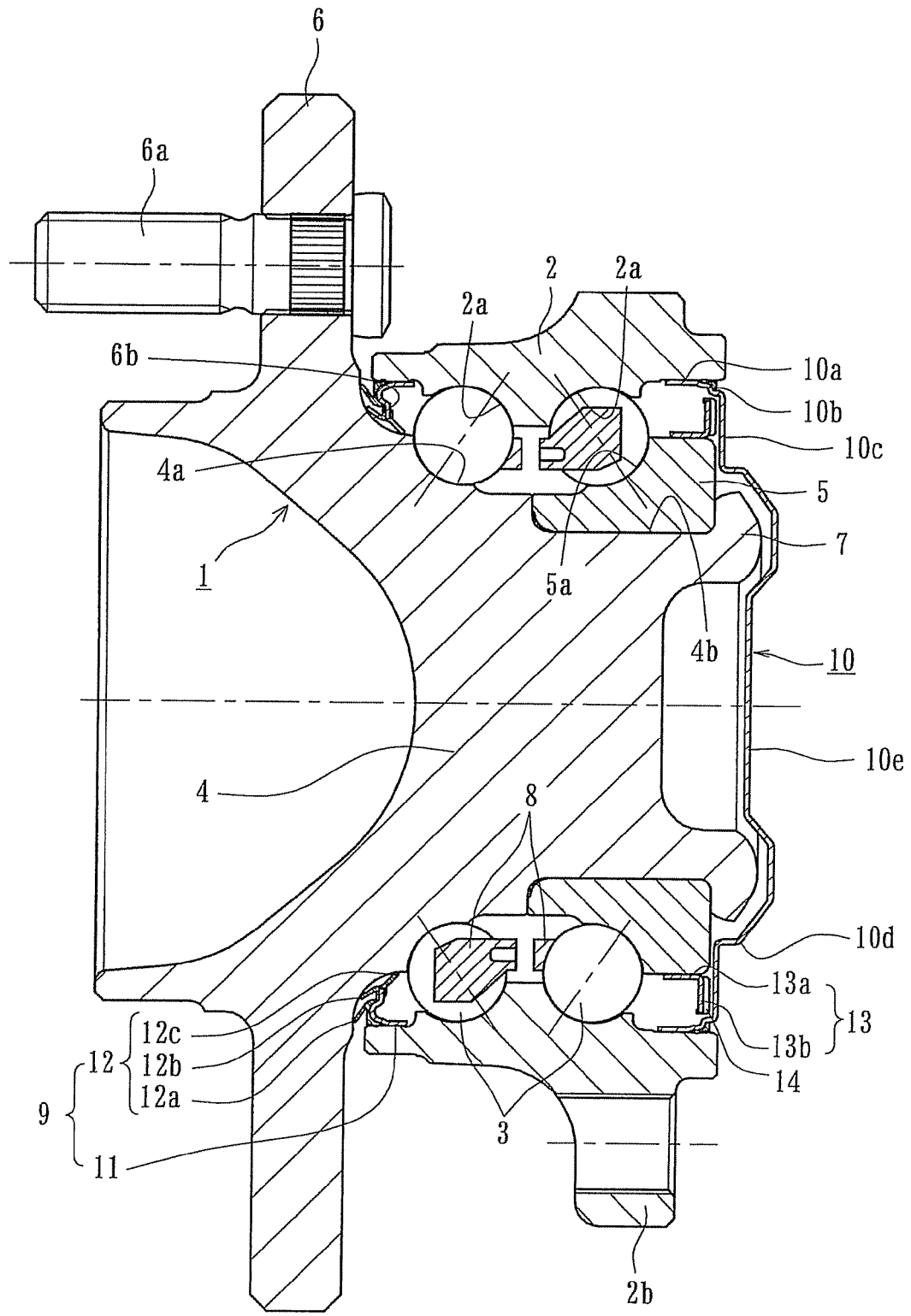
FIG. 1 is a longitudinal-sectional view of a first embodiment of a wheel bearing apparatus.
Figure 2:
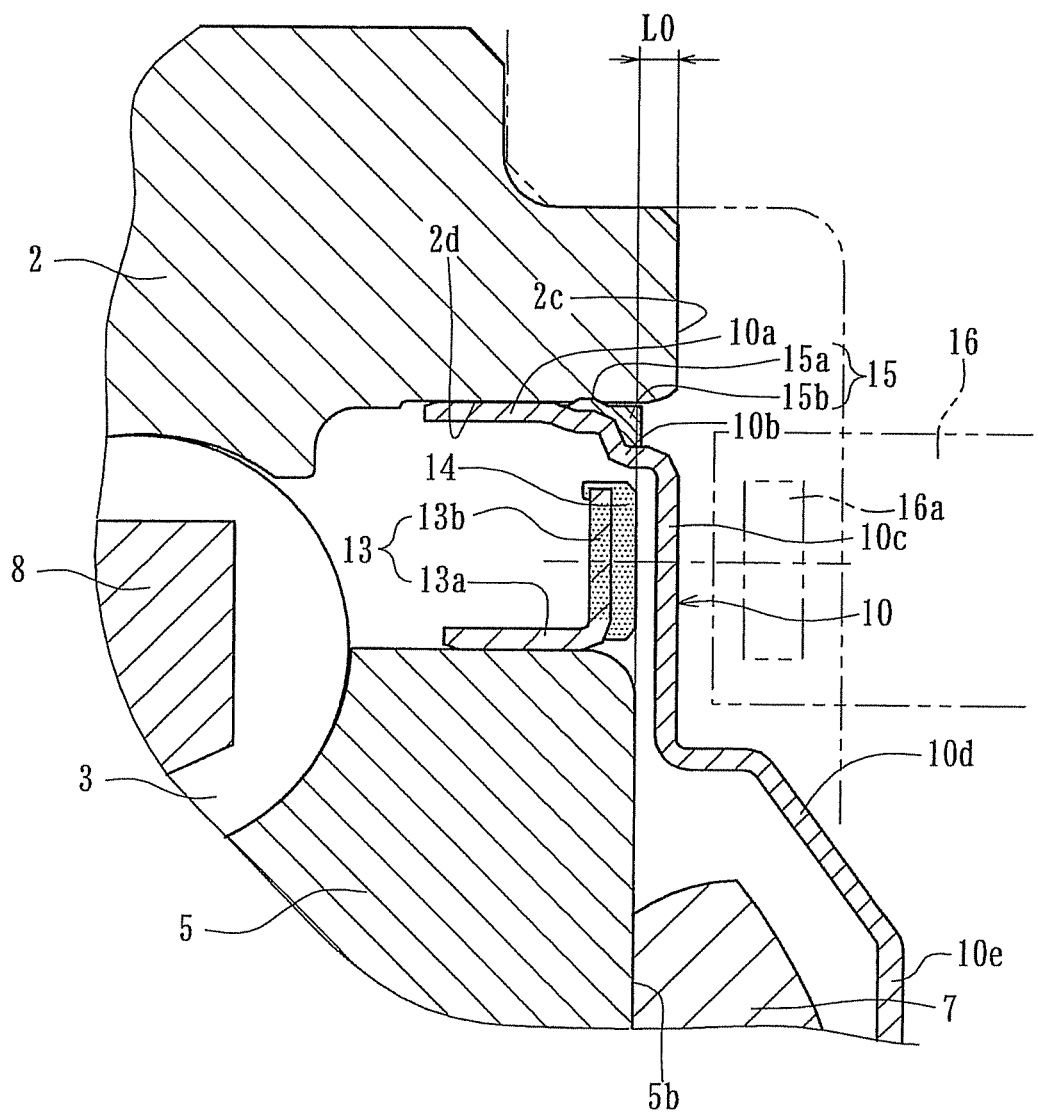
FIG. 2 is a partially enlarged view of a detecting portion of FIG. 1.
Figure 3:
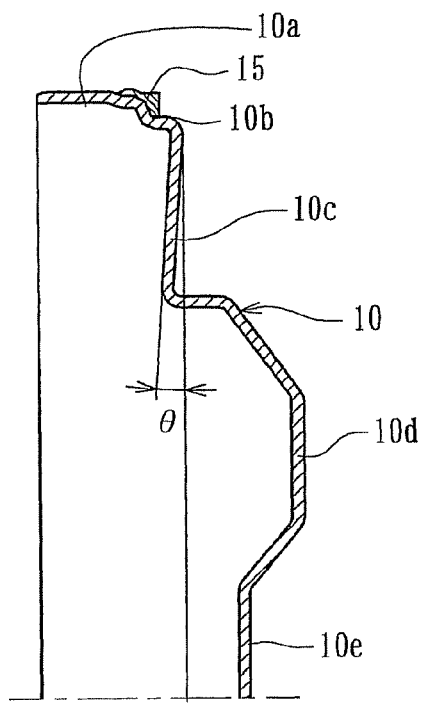
FIG. 3 is a longitudinal-sectional view of a protecting cover.
Figure 4:
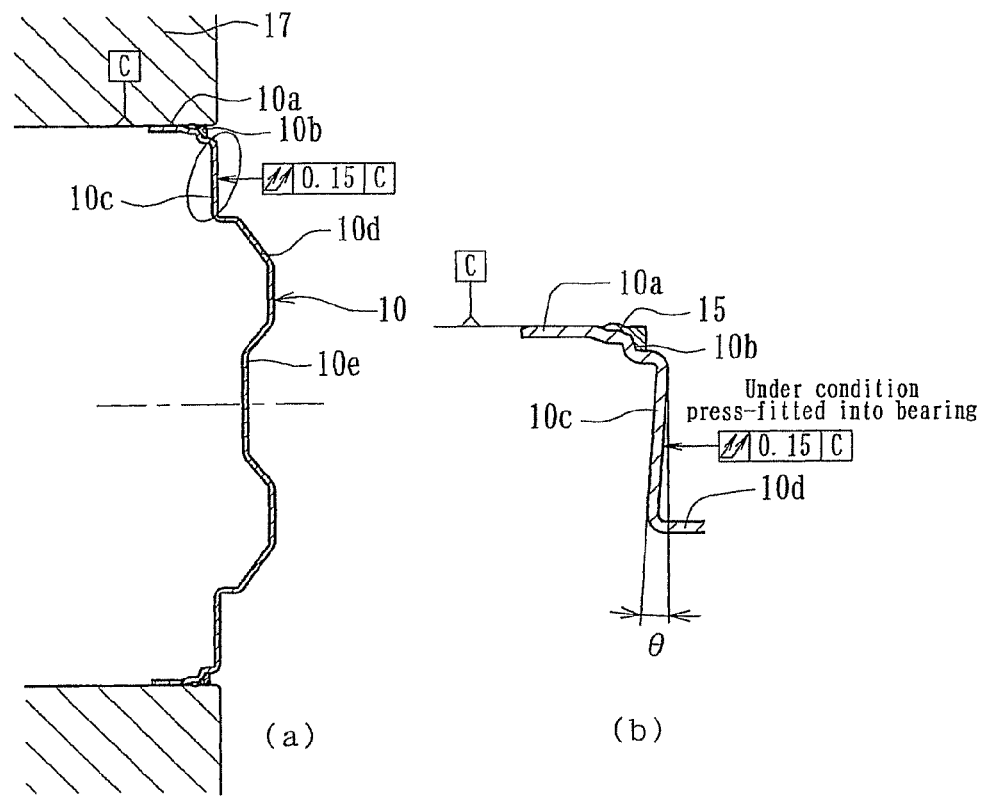
FIG. 4 is an explanatory view of the accuracy assurance of the protecting cover of FIG. 3.
Figure 5:
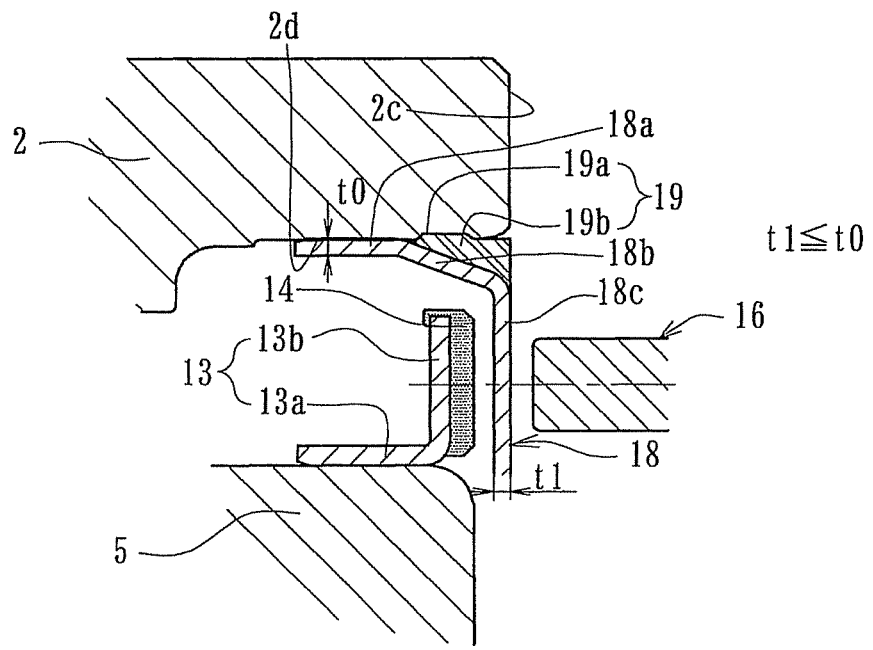
FIG. 5 is a partially enlarged view of a modification of the protecting cover of FIG. 3.
Figure 6:
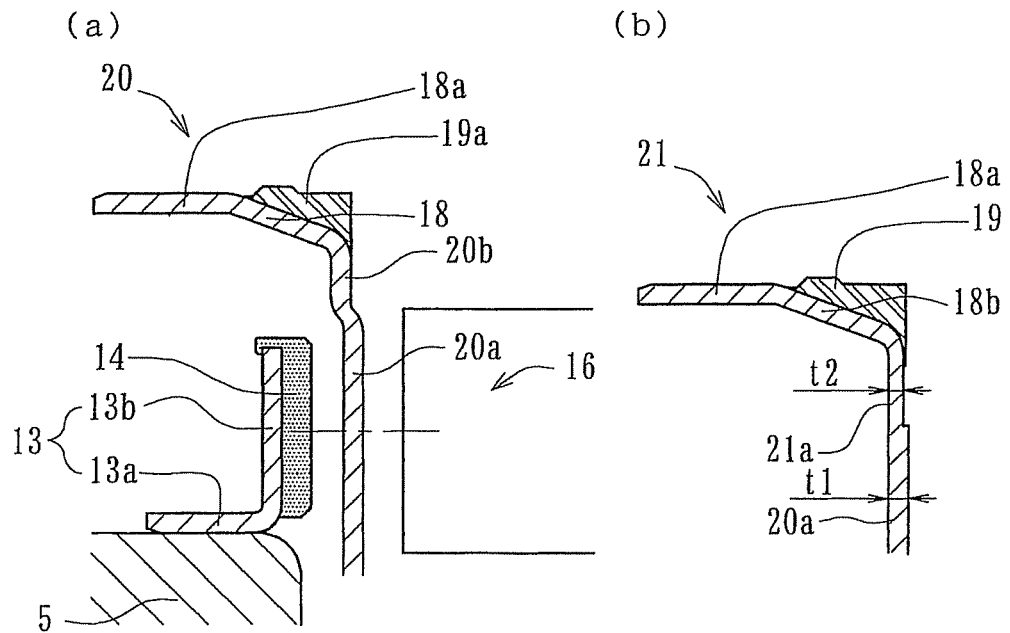
FIG. 6(a) is a partially enlarged view of another modification of the protecting cover of FIG. 3.
FIG. 6(b) is a partially enlarged view of a further modification of the protecting cover of FIG. 3.

FIG. 1 is a longitudinal-sectional view of a first embodiment of a wheel bearing apparatus. FIG. 2 is a partially enlarged view of a detecting portion of FIG. 1. FIG. 3 is a longitudinal sectional view of a protecting cover of the present disclosure. FIG. 4 is an explanatory view of the accuracy assurance of the protecting cover of FIG. 3. FIG. 5 is a partially enlarged view of a modification of the protecting cover of FIG. 3. FIG. 6(*a*) is a partially enlarged view showing another modification of the protecting cover of FIG. 3. FIG. 6(*b*) is a partially enlarged view of a further modification of the protecting cover of FIG. 3. In the description below, an outer-side of a bearing apparatus, when it is mounted on a vehicle, is referred to as the "outer-side" (a left side in a drawing). An inner-side of a bearing apparatus, when it is mounted on a vehicle, is referred to as the "inner side" (a right side in a drawing).

The wheel bearing apparatus of the present disclosure is a so-called "third generation" type for a driven wheel. It includes an inner member 1, an outer member 2, and double row rolling elements (balls) 3, 3 freely rollably contained between the inner and outer members 1 and 2. The inner member 1 includes the wheel hub 4 and an inner ring 5 press-fit onto the wheel hub 4 via a predetermined interference.

Outer member 2 is formed of medium-high carbon steel such as S53C including carbon of 0.40-0.80% by weight. It is formed, on its outer circumference, with body mount flange 2*b* adapted to be mounted on a knuckle (not shown). The outer member inner circumference includes double row outer raceway surfaces 2*a*, 2*a*. The double row outer raceway surfaces 2*a*, 2*a* are hardened by high frequency induction hardening to have a surface hardness of 58-64 HRC.

The wheel hub 4 is integrally formed, on its outer-side end, with a wheel mount flange 6 for mounting a wheel (not shown). Hub bolts 6*a* are secured on the wheel mounting flange 6 at circumferentially equidistant positions. In addition, the wheel hub 4 is formed, on its outer circumference, with one (outer-side) inner raceway surface 4*a*. A cylindrical portion 4*b* axially extends from the inner raceway surface 4*a*. The inner ring 5 is press-fit, via a predetermined interference, and is axially secured on the wheel hub 4 at the cylindrical portion 4*b*. A predetermined bearing pre-pressure is applied on the inner ring by a caulked portion 7. The caulked portion is formed by plastically deforming the end of the cylindrical portion 4*b* radially outward. An inner-side inner raceway surface 5*a* is formed on the outer circumference of the inner ring 5.

The double row rolling elements 3, 3 are contained between the double row outer raceway surfaces 2*a*, 2*a* of the outer member 2 and the double row inner raceway surfaces 4*a*, 5*a*. The balls are rollably held therein by cages 8, 8. Annular openings are formed between the outer member 2 and the inner member 1. A seal 9 is mounted on the outer-side opening. A magnetic encoder 14 and protecting cover 10 are mounted on the inner-side opening. They close and seal annular openings and prevent leakage of lubricating grease sealed within the bearing and the entry of rain water or dust from the outside into the bearing.

The wheel hub 4 is made of medium-high carbon steel such as S53C including carbon of 0.40-0.80% by weight. It is hardened by high frequency induction hardening to have a surface hardness of 58-64 HRC over the inner raceway surface 4*a* and a region from an inner-side base 6*b* of the wheel mounting flange 6 to the cylindrical portion 4b. The caulked portion 7 is not hardened and is kept with a hardness after forging. This enables easy caulking work and prevents the generation of micro cracks during machining. In addition, not only the frictional resistance of the base 6b forming a seal land portion of the seal 9 can be improved but the durability of the wheel hub 4 can also be improved due to the increased mechanical strength against the rotary bending applied to the wheel mounting flange 6. The inner ring 5 and the rolling elements 3 are formed from high carbon chrome steel such as SUR and are dip hardened to their cores to have a hardness of 58-64 HRC.

Although it is shown that the wheel bearing apparatus is formed by a double row angular contact ball bearing using balls as the rolling elements 3, it is understood that the present disclosure is not limited to such a bearing and may include a double row tapered roller bearing using tapered rollers as the rolling elements 3. In addition, although the bearing is shown as a third generation type, the present disclosure can be applied to first and second generation type bearings (not shown) where a pair of inner rings is press-fit onto the cylindrical portion of the wheel hub.

Seal 9 is formed as an integrated seal with a metal core 11 and a sealing member 12. The metal core 11 is press-fit into the outer-side end of the outer member 2, via a predetermined interface. The sealing member 12 is adhered to the metal core 11, via vulcanizing adhesion. The metal core 11 is press-formed of austenitic stainless steel sheet (JIS SUS 304, etc.) or cold rolled steel sheet (JIS SPCC, etc.)

The sealing member 12 is formed from synthetic rubber such as NBR (acrylonitrile-butadiene rubber). The sealing member 12 includes a side lip 12a, a dust lip 12b, and grease lips 12c. The side lip 12a is inclined radially outward and is in sliding-contact with the inner-side surface of the wheel mounting flange 6, via a predetermined interference. The dust lip 12b is in sliding-contact with the base 6b of circular arc section via a predetermined interference. The grease lips 12c are inclined toward the inside of the wheel bearing and are in sliding-contact with the base 6b of the circular arc section, via a predetermined interference. The grease lips 12c may be a non-contact type.

There are examples of material of sealing member 12 other than NBR such as HNBR (hydrogenated acrylonitrile-butadiene rubber), EPDM (ethylene propylene rubber), ACM (poly-acrylic rubber) superior in heat and chemical resistance, FKM (fluororubber) or silicone rubber.

An annular supporting member 13 with an L-shaped longitudinal section is press-fit onto the outer circumference of the inner ring 5. The supporting member 13 includes a cylindrical portion 13a and a standing portion 13b. The cylindrical portion 13a is press-fit onto the outer circumference of the inner ring 5. The standing portion 13b extends radially outward from the cylindrical portion 13a. A magnetic encoder 14 is integrally adhered to the inner-side surface of the standing portion 13b by vulcanizing adhesion. The magnetic encoder 14 is formed from an elastomer such as synthetic rubber. Ferritic magnetic powder is mingled into the elastomer so that N and S poles are alternately arranged along its circumference.

Although it is shown with a pulser ring having the magnetic encoder 14 as a rubber magnet, it is possible to use other kinds of encoders such as a pulser ring made from steel sheet formed with a plurality of through apertures or irregularities or formed from sintered alloy or that to which a plastic magnet plate is adhered.

The annular supporting member 13 is formed by press working from a steel plate such as ferritic stainless steel sheet (MS SUS 430, etc.) or preserved cold rolled steel sheet (JIS SPCC, etc.). Accordingly, it is possible to prevent the generation of corrosion on the supporting member 13 and to assure a magnetic output of the magnetic encoder 14 to have a strong and stable detecting accuracy.

A protecting cover 10 is mounted on the inner-side end of the outer member 2. The cover 10 is formed by press working from a non-magnetic austenitic stainless steel sheet (JIS SUS 304, etc.) to have a dish-shaped configuration. As shown in FIG. 2, the protecting cover 10 includes a cylindrical fitting portion 10a a disk-shaped shield portion 10c, a radial reducing portion 10b, a stepped portion 10d, and a bottom portion 10e. The cylindrical fitting portion 10a is press-fit into the end inner circumference of the outer member 2. The disk-shaped shielding portion 10c extends radially inward from the fitting portion 10a, via a radially reducing portion 10b. The bottom portion 10e is continuous with the shielding portion 10c, via a stepped portion 10d, to close the inner-side end of the inner member 1. A detecting portion 16a, of the rotation speed sensor 16, is arranged near or in contact with the shielding portion 10c of the protecting cover 10. The detecting portion 16a is arranged opposite to the magnetic encoder 14 at a predetermined air gap (axial gap) via the protecting cover 10. Such a stepped sectional configuration enables an increase in rigidity of the protecting cover 10. Thus, this suppresses deformation of the protecting cover 10 due to impingement of pebble, etc. In addition, since the protecting cover 10 is formed of non-magnetic material, an adverse effect is not caused on the magnetic flux, and durability can be assured for a long term.

According to this embodiment, the radially reducing portion 10b has the stepped sectional configuration. A sealing member 15 is secured to the outer circumference of the radially reducing portion 10b. The sealing member 15 is formed from synthetic rubber such as NBR (acrylonitrile-butadiene rubber) and is integrally adhered to the protecting cover 10, by vulcanizing adhesion. The sealing member 15 includes a projected portion 15a and an annular portion 15b. The annular portion 15b is formed with a diameter slightly smaller than the outer diameter of the fitting portion 10a. The projected portion 15a is formed with a diameter slightly larger than the outer diameter of the fitting portion 10a. The projected portion 15a is press-fit into the end inner circumference 2d of the outer member 2, via a predetermined interference. The sealing member 15 improves the sealability of the fitting surfaces between the outer member 2 and the protecting cover 10. Also in this case, there are examples of material of sealing member 12 other than NBR such as HNBR (hydrogenated acrylonitrile-butadiene rubber), EPDM (ethylene propylene rubber), ACM (poly-acrylic rubber) superior in heat and chemical resistance, FKM (fluororubber) or silicone rubber.

The sealing member 15 is formed from rubber material with the compression set of physical properties of rubber of 40% or less at 120° C.×70 hours and the TR10 value (extension rate: 50%) of −35° C. or less. This improves strain recovery ability of the sealing member 15, even at low temperatures. Thus, desirable sealing performance can be maintained. The TR10 value means a temperature at which 10% recovery of a previously applied strain of material is attained and a value near the TR10 value has been empirically used as the low temperature limit value.

The fitting volume of the projected portion 15a of the sealing member 15 is set so that it is smaller than a volume of an annular space formed between the annular portion 15b of the sealing member 15 and the inner circumference (fitting surface) 2d of the outer member 2. That is, if the projected portion 15a of the sealing member 15 is bulged to the inner-side by compression, the annular portion 15b of the sealing member 15 can form an escaping space to receive the projected portion 15a of the sealing member 15. This prevents the sealing member 15 from bulging out from the inner-side surface of the shielding portion 10c. In addition, a compression rate of the projected portion 15a is limited to smaller than 45% or less. Accordingly, it is possible to prevent the sealing member 15 from being damaged by projecting from the end face 2c of the outer member 2 during press-fitting of the protecting cover 10. Also, it prevents interference of the sealing member 15 with the rotation speed sensor 16 due to its projection from the inner-side surface of the shielding portion 10c.

If the compression rate of the projected portion 15a of the sealing member 15 exceeds 45%, difficulty in the press-fitting operation will be increased. Also, the elasticity of the material of the sealing member 15 and sealability will be reduced due to the damage during press-fitting operation.

According to this embodiment, the inner-side end surface 2c of the outer member 2 projects, by a small distance L0, from a large end surface 5b of the inner ring 5 toward the inner-side. In addition, the shielding portion 10c of the protecting cover 10 and the end face 2c of the outer member 2 are substantially coplanar. Also, the detecting surface of the magnetic encoder 14 and the large end surface 5b of the inner ring 5 are also substantially coplanar. This makes it possible to prevent the protecting cover 10 from abutting against the inner ring 5. In addition, if the detecting surface of the magnetic encoder 14 and the large end surface 5b of the inner ring 5 are substantially coplanar or slightly projects from the large end surface 5b of the inner ring 5, it is possible to accurately position the protecting cover 10 on the basis of the end face 2c of the outer member 2. The annular supporting member 13 is positioned on the basis of the large end surface 5b of the inner ring 5. Thus, adjustment of the air gap can be easily achieved and the detecting accuracy can be improved.

Only the fitting portion 10a of the protecting cover 10 is press-fit into the outer member 2 when the protecting cover 10 is mounted on the outer member 2. The disk-shaped shielding portion 10c is sometimes deformed due to the press-fitting interference between the protecting cover 10 and the outer member 2. Thus, the shielding portion 10c is bulged toward the inner-side. Accordingly, the shielding portion 10c of the protecting cover 10 is formed so that it is inclined toward the outer-side by a predetermined inclined angle θ.

The accuracy (geometrical interference) control and accuracy assurance of each portion of the protecting cover 10 can be performed under a condition where the fitting portion 10a is chucked by a press-fitting tool 17, as shown in FIG. 4(a). In particular as shown in FIG. 4(b), the allowable limitation of the full deflection of the shielding portion 10c of the protecting cover 10, where the rotation speed sensor 16 and the magnetic encoder 14 oppose one another, is 0.15 mm or less, and preferably 0.15 mm or less. In this case, the applied load to the press-fitting tool 17 is set to a load that is the same as the fitting load actually applied to the outer member 2.

The rotational speed sensor 16 is formed from injection moldable synthetic resin such as PA66. An IC circuit incorporated with a Hall element, a magnetic resistance element (MR element), and a waveform shaping circuit to shape the output waveform of the magnetic detecting element (not shown) are embedded into sensor 16. This forms the ABS of an automobile to detect the rotational speed of a wheel and control it.

FIG. 5 shows one modification of the protecting cover 10. This protecting cover 18 is different only in the structure of the fitting portion. The rest is substantially the same as the protecting cover 10. Accordingly, the same reference numerals are used to designate the same structural elements.

The protecting cover 18 is formed by press working non-magnetic austenitic stainless steel sheet (MS SUS 304 etc.) to have a dish-shaped configuration. The protecting cover 18 has a cylindrical fitting portion 18a, a radially reducing portion 18b, and a disk-shaped shielding portion 18c. The cylindrical fitting portion 18a is press-fit into the end inner circumference of the outer member 2. The disk-shaped shielding portion 18c extends radially inward from the fitting portion 18a, via the radially reducing portion 18b.

The radially reducing portion 18b of the protecting cover 18 is tapered so that its radius gradually reduces toward the inner-side direction. A sealing member 19 is integrally adhered to the outer circumference of the radially reducing portion 18b, via vulcanizing adhesion. A fitting volume of the projected portion 19a of the sealing member 19 is set, so that, it is smaller than a volume of an annular space formed between the annular portion 19b, of the sealing member 19, and the inner circumference of the outer member 2. When a press-fitting tool abuts against the sealing member 19 the end face of the sealing member 19 does not project from the inner-side side surface of the shielding portion 18c. In addition, the sheet thickness t1 of the shielding portion 18c of the protecting cover 18 is smaller than the sheet thickness t0 (t1≤t0). An adhesive is adhered to the fitting portion 18a. This makes it possible to set a small air gap and to improve the sealability between the outer member 2 and the fitting portion 18a without strictly limiting the dimensional accuracy of the protecting cover 18 and the outer member 2. Examples of the adhesive are those of epoxy resin, phenol resin, polyurethane families or polyethylene families.

A liquid sealing agent may be applied between the fitting portion 18a of the protecting cover 18 and the fitting surface 2d of the outer member 2 in place of the adhesive. The liquid sealing agent is called a "liquid gasket" of non-drying paste including denaturation ester resin as a main component. It can seal the gap between the protecting cover 18 and the outer member 2 without being peeled due to the press-fitting of the protecting cover 18 (trade name: "Three Bond 1121"). In addition, since the liquid sealing agent also has a stickiness, it is able to keep fixation of the protecting cover 18 for a long term. Thus, this improves the reliability of the wheel rotation detection while preventing entry of rain water or dust into the detecting portion. It is possible to use liquid sealing agents with phenol, acrylic or silicone family resins as the main component other than the liquid sealing agent including a denaturation ester resin as the main component.

A protecting cover 20 shown in FIG. 6(a) comprises the cylindrical fitting portion 18a, the disc-shaped shielding portion 20a and a stepped portion 20b. The disk-shaped shielding portion 20a extends radially inward from the fitting portion 18a via the radially reducing portion 18b. A stepped portion 20b is recessed from the shielding portion 20a toward the outer-side between the shielding portion 20a and the radially reducing portion 18b. This makes it possible to prevent the shielding portion 20a, where the rotation speed detecting sensor 16 is contacted or closely arranged, from being influenced by the sealing member 19 that would bulge out during galvanizing adhesion. Thus, this assures a desirable detecting accuracy.

A protecting cover 21 shown in FIG. 6(b) includes the cylindrical fitting portion 18a. The disk-shaped shielding portion 20a extends radially inward from the fitting portion 18a, via the radially reducing portion 18b. A thinned portion 21a is formed between the shielding portion 20a and radial reducing portion 18b. The sheet thickness t2 of the thinned portion 21a is thinner than the sheet thickness t1 of the shielding portion 20a (t2≤t1). This makes it possible to set a minimum air gap between the rotation speed detecting sensor 16 and the magnetic encoder 14. This further improves the detecting accuracy.

Figure 7:
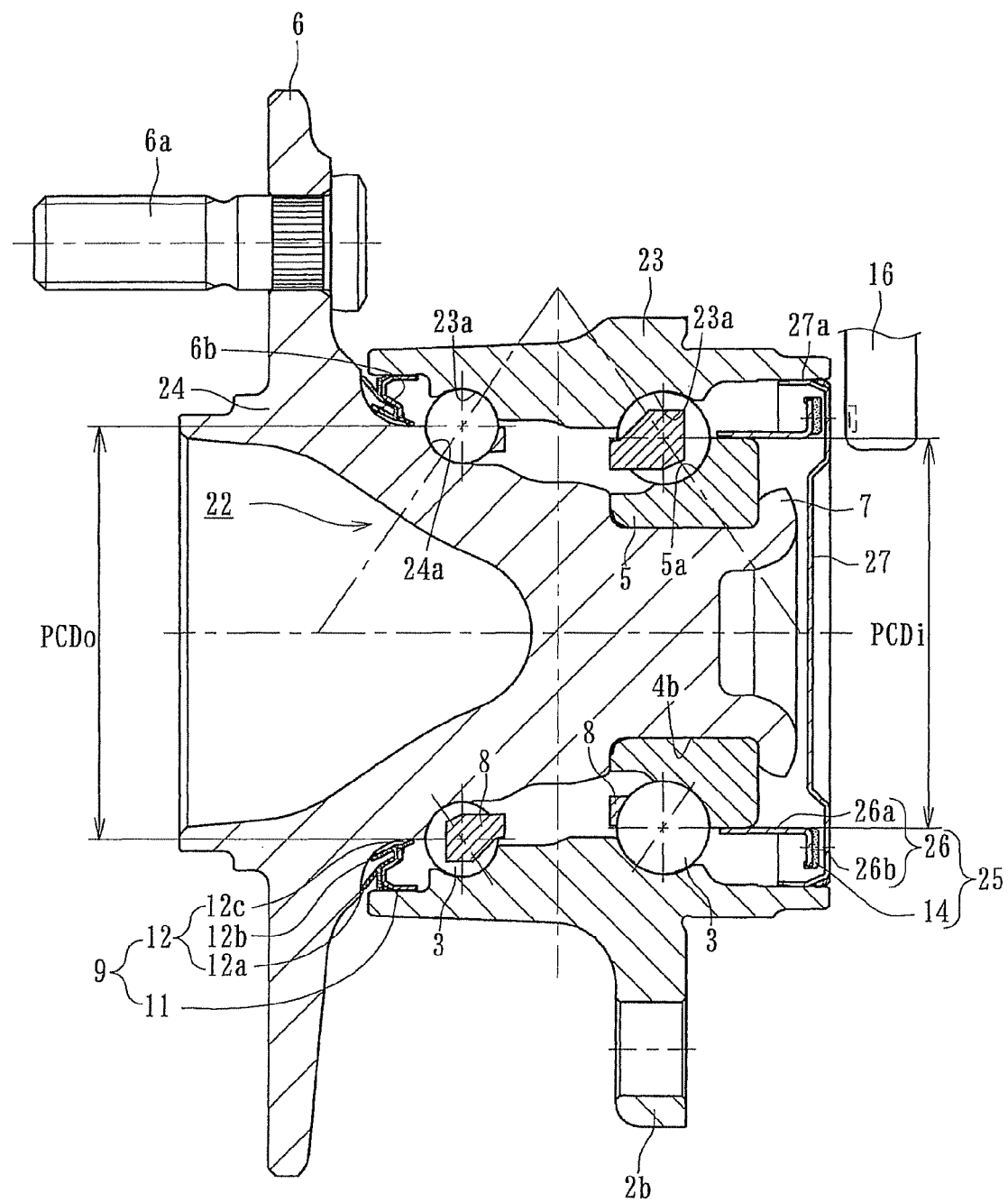
FIG. 7 is a longitudinal-sectional view of a second embodiment of a wheel bearing apparatus.
Figure 8:
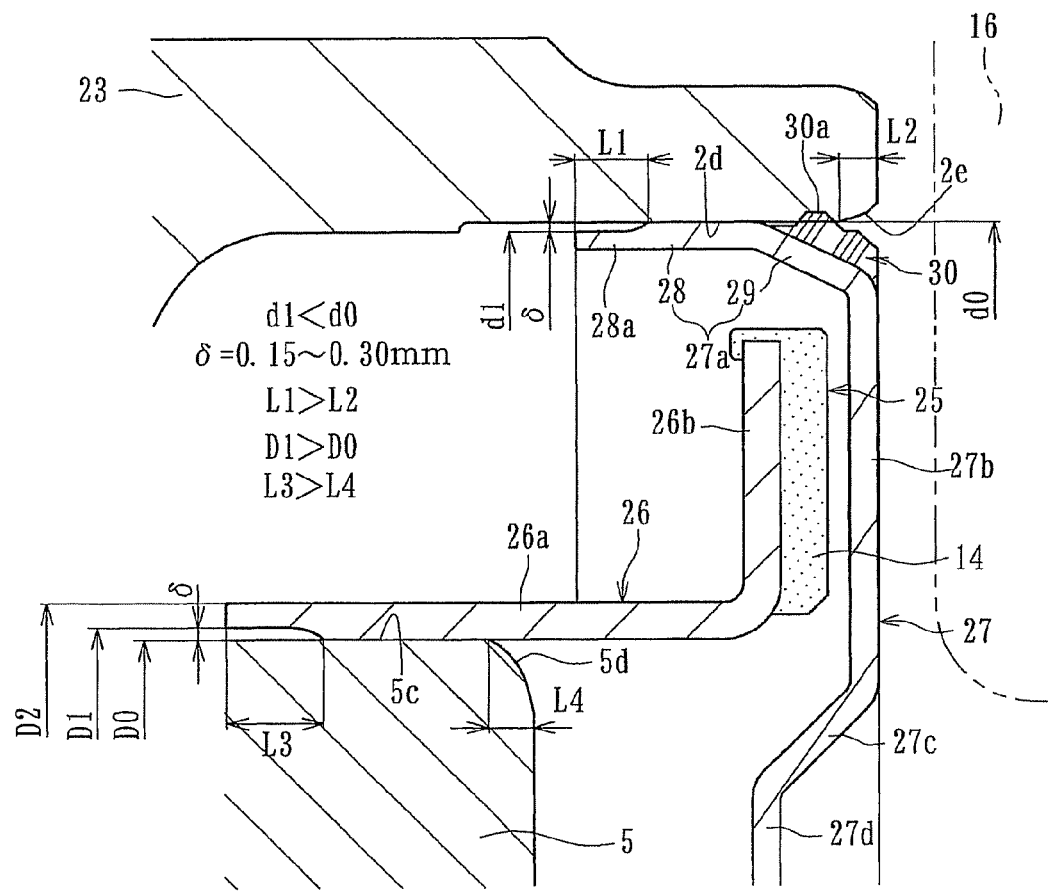
FIG. 8 is a partially enlarged view of a mounted condition of the protecting cover and pulser ring of FIG. 7.
Figure 9:
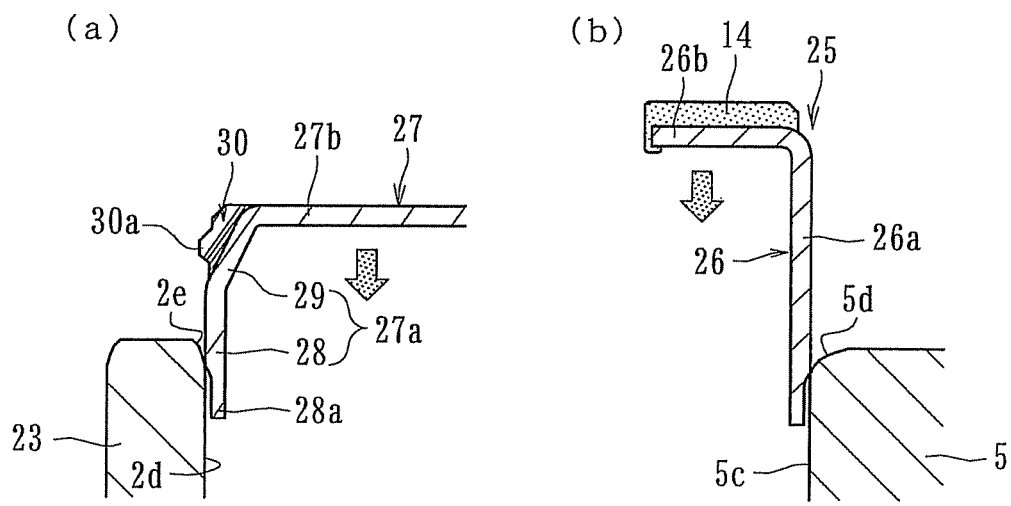
FIG. 9(a) is an explanatory view of the preset of the protecting cover of FIG. 8.
FIG. 9(b) is an explanatory view of the preset of the pulser ring of FIG. 8.
Figure 10:
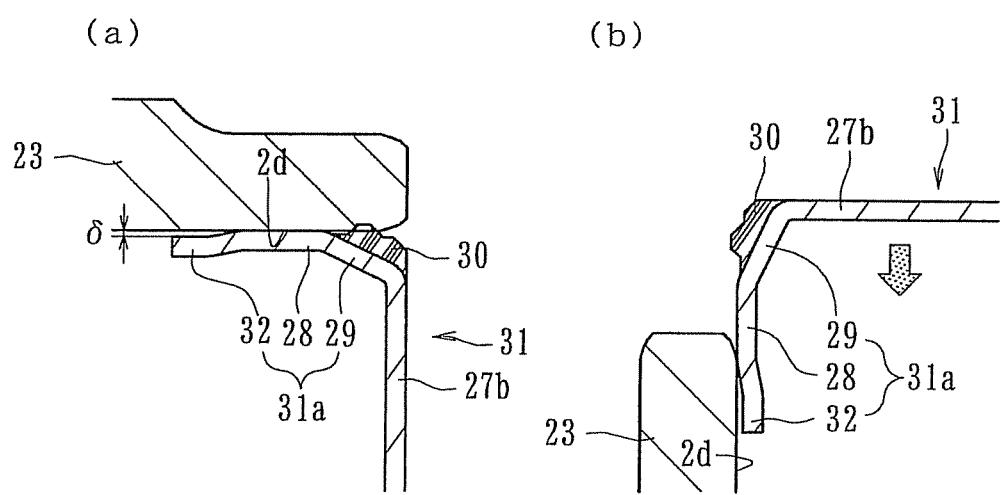
FIG. 10(a) is a partially enlarged view of a modification of the protecting cover of FIG. 8.
FIG. 10(b) is a partially enlarged view of a preset of the protecting cover of FIG. 8.
Figure 13:
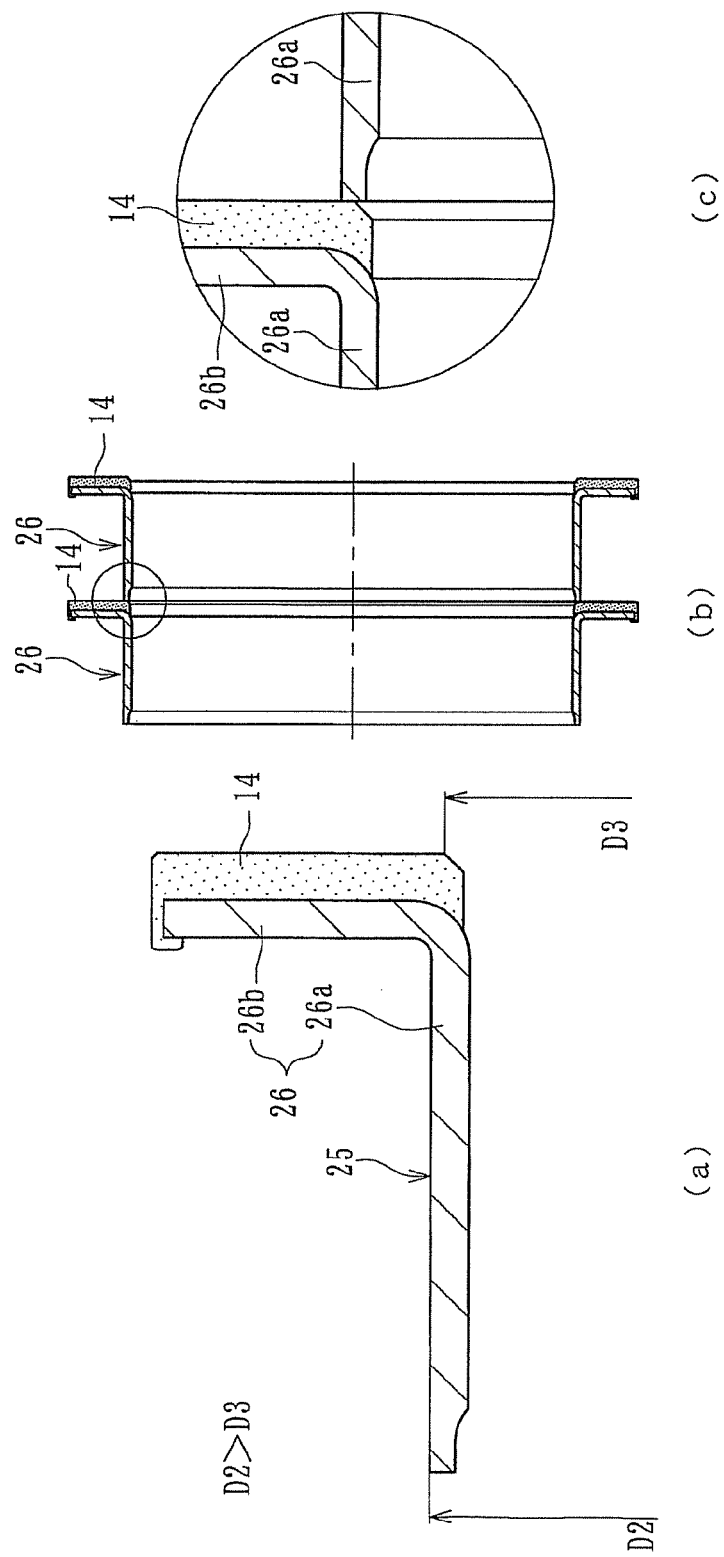
FIG. 13(a) is a partially enlarged sectional view of the pulser ring of FIG. 8.
FIG. 13(b) is an explanatory view of nesting of the pulser ring of FIG. 13(a)
FIG. 13(c) is a partially enlarged view of FIG. 13(b)

FIG. 7 is a longitudinal-sectional view of a second embodiment of a wheel bearing apparatus. FIG. 8 is a partially enlarged view of a condition where the protecting cover and pulser ring of FIG. 7 are mounted. FIG. 9(a) is an explanatory view of the preset of the protecting cover of FIG. 8. FIG. 9(b) is an explanatory view of the preset of the pulser ring of FIG. 8. FIG. 10(a) is a partially enlarged view of a modification of the protecting cover of FIG. 8. FIG. 10(b) is a partially enlarged view of a preset of the protecting cover of FIG. 8. FIG. 11(a) is a partially enlarged sectional view of the protecting cover of FIG. 8. FIG. 11(b) is an explanatory view of nesting of the protecting cover. FIG. 11(c) is a partially enlarged view of FIG. 11(b). FIG. 12(a) is a longitudinal sectional view of a modification of the pulser ring of FIG. 8. FIG. 12(b) is a partially enlarged sectional view of FIG. 8(a). FIG. 13(a) is a partially enlarged sectional view of the pulser ring of FIG. 8. FIG. 13(b) is an explanatory view of nesting of the pulser ring of FIG. 13(a). FIG. 13(c) is a partially enlarged view of FIG. 13(b). FIG. 14(a) is an explanatory view of the accuracy of the protecting cover of FIG. 8. FIG. 14(b) is an explanatory view of the accuracy of the pulser ring of FIG. 8. The same reference numerals are used to designate the same structural elements of the previous embodiment and the detailed description of them is omitted.

The wheel bearing apparatus shown in FIG. 7 is a so-called "third generation" type for a driven wheel. It includes an inner member 22, an outer member 23, and double row rolling elements (balls) 3, 3 contained between the inner and outer members 22 and 23. The inner member 22 includes the wheel hub 24 and a separate inner ring 5 press-fit onto the wheel hub 24.

The wheel hub 24 is integrally formed, on its outer-side end, with a wheel mount flange 6. The wheel hub 24 outer circumference includes one (i.e. outer-side) inner raceway surface 24a. The cylindrical portion 4b axially extends from the inner raceway surface 24a.

The wheel hub 24 is made of medium-high carbon steel such as S53C including carbon of 0.40~0.80% by weight. It is hardened by high frequency induction hardening to have a surface hardness of 58~64 HRC over the inner raceway surface 24a and a region from an inner-side base 6b of the wheel mounting flange 6 to the cylindrical portion 4b.

The outer member 23 is formed, on its outer circumference, with the body mount flange 2b. The outer member inner circumference includes double row outer raceway surfaces 23a, 23a that oppose the double row inner raceway surfaces 24a, 5a of the inner member 22. Similar to the wheel hub 24, the outer member 23 is formed of medium-high carbon steel such as S53C including carbon of 0.40~0.80% by weight. At least the double row outer raceway surfaces 23a, 23a are hardened by high frequency induction hardening to have a surface hardness of 58~64 HRC. The double row rolling elements 3, 3 are freely rollably contained between the double row outer raceway surfaces 23a, 23a of the outer member 23 and the double row inner raceway surfaces 24a, 5a and are rollably held by cages 8, 8.

Annular openings are formed between the outer member 23 and the inner member 22. A seal 9 is mounted in the outer-side opening. A protecting cover 27 is mounted in the inner-side opening. The seal 9 and cover 27 prevent leakage of lubricating grease sealed within the bearing and the entry of rain water or dust from the outside into the bearing.

In this embodiment, the pitch circle diameter PCDo of the outer-side row of rolling elements 3 is set larger than the pitch circle diameter PCDi of the inner-side rolling elements 3 (PCDo>PCDi). Due to the difference of the pitch circle diameters PCDo, PCDi, the diameter of each rolling element 3 of the outer-side row is set larger than the diameter of each rolling element 3 of the inner-side row. The number of rolling elements of the outer-side row of rolling element 3 is set larger than the number of rolling elements of the inner-side row of rolling element 3. This makes it possible to effectively use the bearing space and to increase the bearing rigidity of the outer-side compared to that of the inner-side. Thus, this extends the life of the bearing while effectively using the bearing space.

Although it is shown that the wheel bearing apparatus formed by a double row angular contact ball bearings using balls as rolling elements 3, the present disclosure is not limited to such a bearing. A double row tapered roller bearing using tapered rollers as rolling elements 3, may be used. In addition, although the bearing is shown as a third generation type, the present disclosure can be applied to a so-called second generation type.

A pulser ring 25 is press-fit onto the outer circumference of the inner ring 5. The pulser ring 25 includes an annular supporting member 26 formed by press working ferritic stainless steel sheet (JIS SUS 430, etc.) or preserved cold rolled steel sheet. The pulser ring 25 has an L-shaped longitudinal section and the magnetic encoder 14 is integrally adhered to the annular supporting member 26.

As shown in an enlarged view of FIG. 8, the annular supporting member 26 includes a cylindrical fitting portion 26a and a standing portion 26b. The cylindrical fitting portion 26a is press-fit onto the outer circumference Sc of the inner ring 5. The standing portion 26b extends radially outward from the cylindrical fitting portion 26a. The magnetic encoder 14 is integrally adhered to the inner-side surface of the standing portion 26b by vulcanizing adhesion.

Similar to the first embodiment, a protecting cover 27 is press-fit into the inner circumference of the inner-side end of the outer member 23 to close the inner-side opening of the outer member 23. The protecting cover 27 is formed of non-magnetic steel sheet having corrosion resistance e.g. austenitic stainless steel sheet.

The protecting cover 27 includes a cylindrical fitting portion 27a, a disk-shaped shielding portion 27b, a bent portion 27c, and a bottom portion 27d. The cylindrical fitting portion 27a is press-fit into the end inner circumference of the outer member 23. The disk-shaped shielding portion 27b extends radially inward from the fitting portion 27a. The shielding portion 27b is adapted to oppose the magnetic encoder 14, via a slight axial gap. The bottom portion 27d is continuous with the shielding portion 27b via a bent portion 27c to close the inner-side end of the inner member 22.

The detecting portion of the rotation speed detecting sensor 16 is adapted to be arranged close to or in contact with the shielding portion 27b of the protecting cover 27. The detecting portion and the magnetic encoder 14 are arranged opposite to one another at a predetermined air gap (axial gap) via the protecting cover 27.

In this embodiment, the fitting portion 27a includes a cylindrical portion 28 and an inclined portion 29. The cylindrical portion 28 is press-fit into the fitting surface 2d of the inner circumference at the inner-side end of the outer member 23. The radially reducing inclined portion 29 axially extends from the cylindrical portion 28. An elastic member (sealing member) 30 of synthetic rubber such as NBR etc. is adhered on the radially reducing portion 29 via vulcanizing adhesion.

The elastic member 30 is formed so that it does not project from the inner-side surface of the shielding portion of the protecting cover 27. The elastic member 30 has an annular projection (projected portion) 30a projecting radially outward from the outer circumference of the cylindrical portion 28. This annular projection 30 is press-contacted with the inner circumference of the inner-side end of the outer member 23 when the protecting cover 27 is press-fit into the outer member 23. Thus, the sealability of the fitting portion 27a can be improved.

A step δ is formed on the end 28a of the cylindrical portion 28 of the fitting portion 27a. The outer diameter d1 of the step δ is smaller than the inner diameter d0 of the fitting surface 2d of the outer member 23 (d1<d0). This enables the protecting cover 27 to be preset under a coaxially aligned condition of the protecting cover 27 when the protecting cover 27 is press-fit into the outer member 23 as shown in FIG. 9(a). Thus, it is possible to provide a wheel bearing apparatus that can improve the sealability of the fitting portion while preventing the generation of damage or scratches during the press-fitting operation. It also improves the workability during the press-fitting operation. Since the step δ at the end 28a of the cylindrical portion 28 forms a guiding gap, it is preferable that its height is within a range of 0.15~0.30 mm (0.30~0.60 mm in diameter). If it is less than 0.15 mm, fitting workability cannot be expected. If it exceeds 0.30 mm, the end 28a of the cylindrical portion 28 would be plastically deformed during the press-fitting operation.

A width L1 of the step δ of the end 28a of the fitting portion 27a of the cylindrical portion 28 is larger than a width L2 of a chamfered portion 2e of the inner circumference at the end of the outer member 23 (L1>L2). In addition, the press-fitting reference surface relative to the cylindrical portion 28, forming the fitting surface, i.e., the surface deflection of the shielding portion 27b is limited to 0.15 mm or less, as shown in FIG. 14(a). This makes it possible to preset the protecting cover 27 under an attitude controlled condition of the protecting cover 27 when the protecting cover is press-fit into the outer member 23. Thus, this further improves the workability during the press-fitting operation of the protecting cover 27.

These protecting covers 27 are usually stored or stocked. The covers are stored to await the next assembling step in a factory under a nested condition as shown in FIG. 11(b) to save space. In order to prevent the protecting covers 27 from being snugly fit with each other, as shown in FIG. 11(a), an inner diameter d2 of the end 28a of the cylindrical portion 28 of the fitting portion 27a is smaller than an outer diameter d3 of the elastic member 30 (d2<d3). This makes it possible to surely abut the end 28a of the cylindrical portion 28 against the elastic member 30, as shown in FIG. 11(c). Thus, this improves the workability during the assembling step of the protecting cover 27.

There are other configurations to make the preset easy during press-fitting of the protecting cover 27 other than the way of forming the step δ on the end of the fitting portion 27a. For example, one way that is shown in FIG. 10(a) may be adopted. Here, the protecting cover 31, with a fitting portion 31a includes a cylindrical portion 28 to be fit into the fitting surface 2d formed on the inner-side end of the outer member 23. A tapered radially reducing portion 29 is inclined from the cylindrical portion 28. An end 32 of the cylindrical portion 28 is inclined from the cylindrical portion 28. The end 32 has a smaller diameter than the cylindrical portion 28. Similar to the previous embodiment of FIGS. 8 and 9, it is possible, as shown in FIG. 10(b), to preset the protecting cover 27 under a coaxially aligned condition of the protecting cover 27. Thus, this improves the workability during the press-fitting operation of the protecting cover 27 without reducing the sheet thickness of the fitting portion 31a and thus the strength of the fitting portion.

Similar to the protecting cover 27, the pulser ring 25 is also formed with a step δ as shown in FIG. 8. The step δ is formed on the end of the fitting portion 26a of the annular supporting member 26 of the pulser ring 25. The inner diameter D1 of the step δ is larger than the outer diameter D0 of the inner ring 5 (D1>D0). This enables the pulser ring 25 to be preset under a coaxially aligned condition of the pulser ring 25 when the pulser ring 25 is press-fit onto the inner ring 5, as shown in FIG. 9(b). Thus, it is possible to improve the sealability of the fitting portion while preventing the generation of damage or scratches during the press-fitting operation. Also, this improves the workability during the press-fitting operation.

A width L3 of the step δ of the end of the fitting portion 26a of the annular supporting member 26 is larger than a width L4 of a chamfered portion 5d of the outer circumference at the end of the inner ring 5 (L3>L4). In addition, the press-fitting reference surface relative to the fitting portion 26a, i.e. the perpendicularity of the magnetic encoder 14 is limited to 0.30 mm or less as shown in FIG. 14(b). This makes it possible to preset the pulser ring 25 under an attitude controlled condition of the pulser ring 25 when the pulser ring 25 is press-fit onto the inner ring 5. Thus, this further improves the workability during the press-fitting operation of the pulser ring 25.

Also similar to the protecting cover 27, these pulser rings 25 are usually stored or stocked to await the next assembling step in a factory. They are stored under a nested condition as shown in FIG. 13(b) to save space. In order to prevent the pulser rings 25 from being snugly fit to each other, as shown in FIG. 13(a), an inner diameter D2 of the fitting portion 26a of the annular supporting member 26 is larger than an inner diameter D3 of the magnetic encoder 14 (D2>D3). This makes it possible to surely abut the fitting portion 26a of the annular supporting member 26 against the magnetic encoder 14 as shown in FIG. 13(c). Thus, this improves the workability in the assembling step of the pulser ring 25.

FIG. 12(a) shows a modification of the pulser ring 25 of FIG. 8. This pulser ring 33 is press-formed of ferromagnetic steel sheet such as ferritic stainless steel sheet or preserved cold rolled steel sheet. The pulser ring 25 includes an annular supporting member 34 with an L-shaped longitudinal section. A magnetic encoder 35 is integrally adhered to the annular supporting member 34.

As shown in an enlarged view of FIG. 12(b), the annular supporting member 34 includes the cylindrical fitting portion 26a and a standing portion 34a. The cylindrical fitting portion 26a is press-fit onto the inner ring 5. The standing portion 34a radially inwardly extends from the fitting portion 26a. A magnetic encoder 35 is integrally adhered to the inner-side surface of the standing portion 34a. The step δ is formed on the end of the fitting portion 26a. According to this modification, since the standing portion 34a extends radially inward from the fitting portion 26a, it is possible to reduce the size of the pulser ring 25. This prevents the pulser rings 25 from being snugly fit inside each other.

Figure 15:
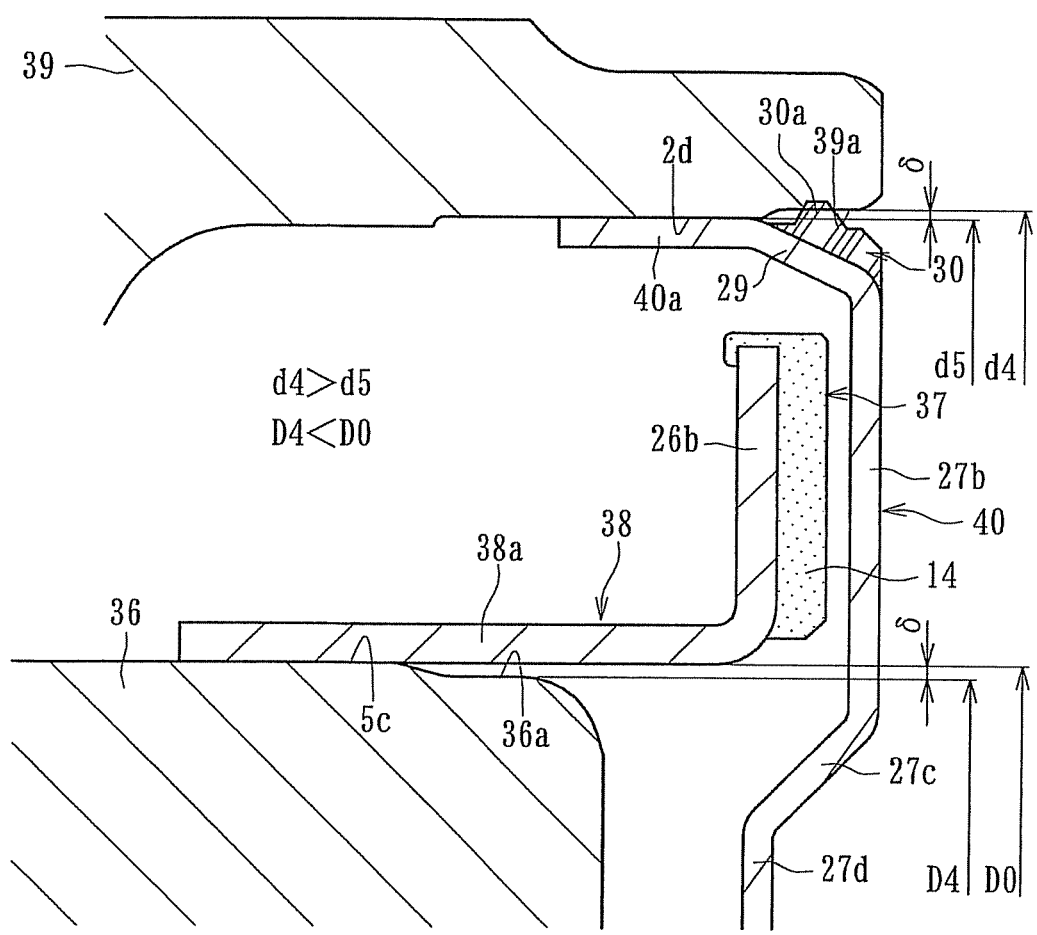
FIG. 15 is a longitudinal-sectional view of a third embodiment of a wheel bearing apparatus.
Figure 16:
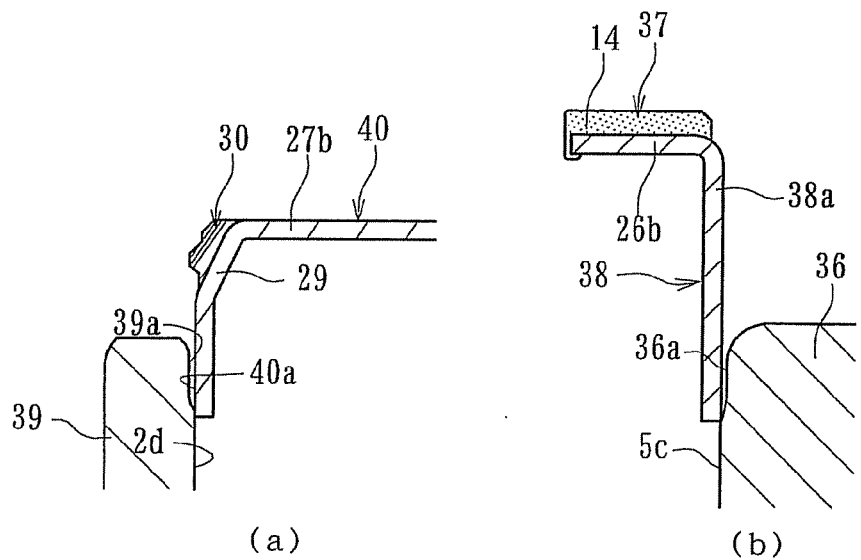
FIG. 16(*a*) is an explanatory view of a preset of the protecting cover of FIG. 15.
Figure 17:
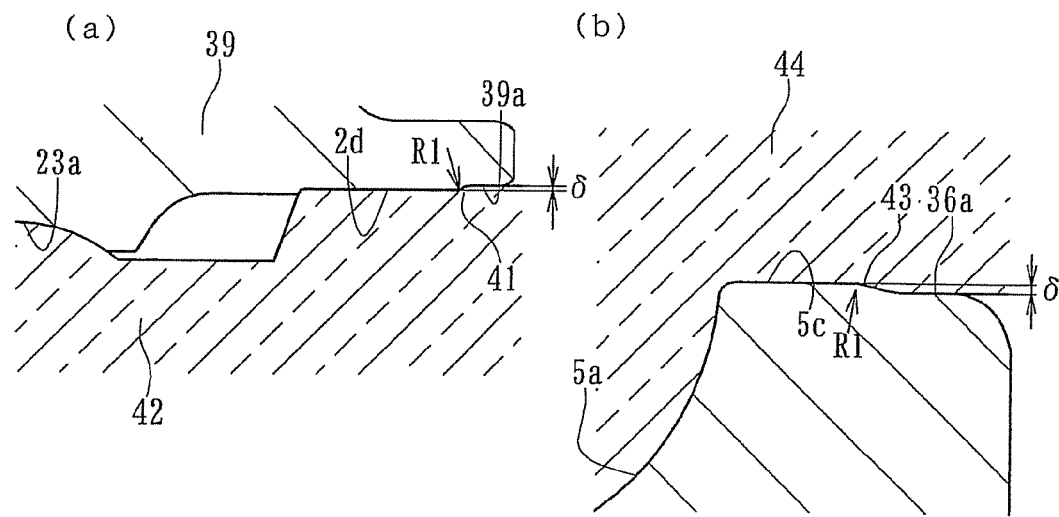
FIG. 17(*a*) is an explanatory view of a method for processing the outer member of FIG. 15.
Figure 18:
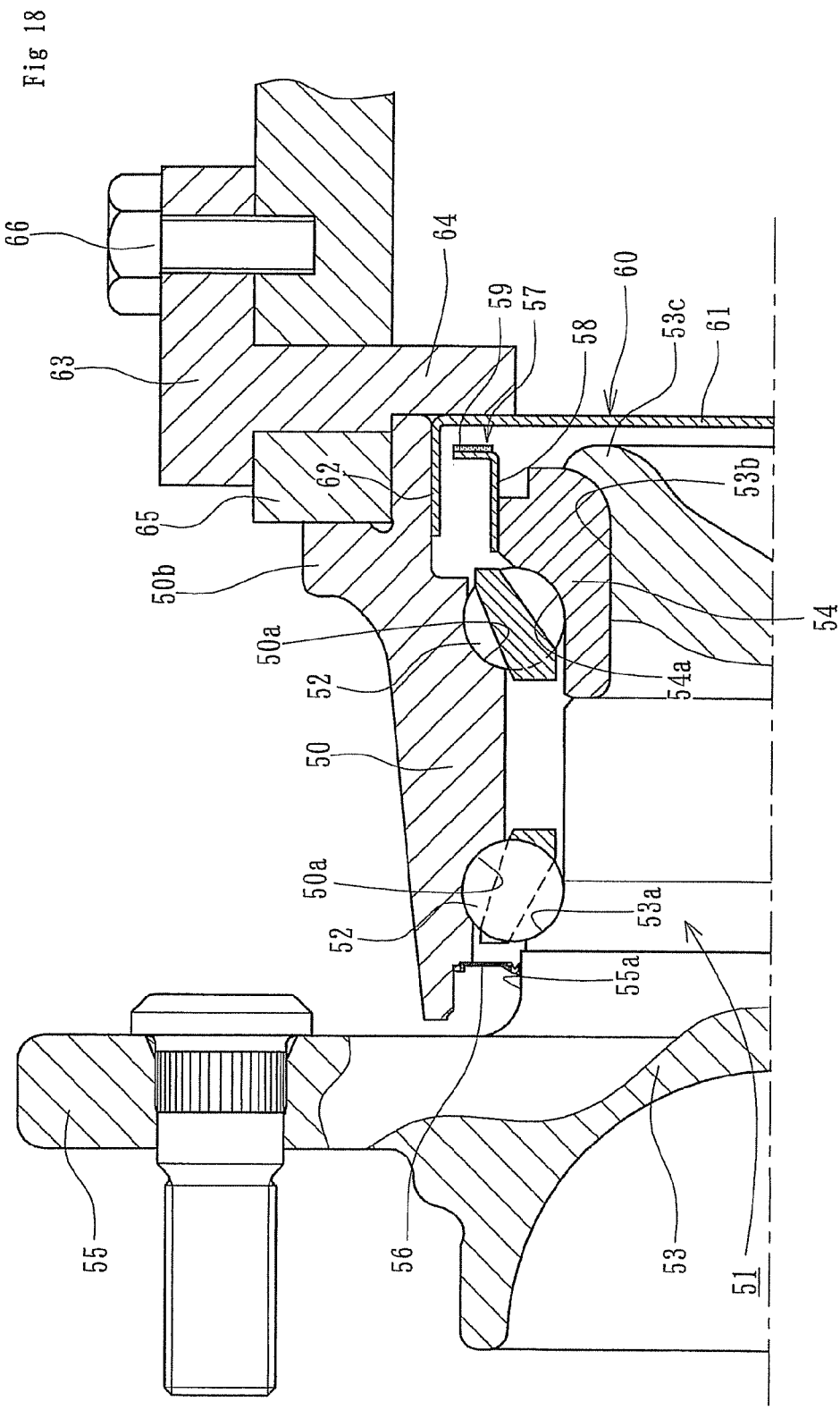
FIG. 18 is a longitudinal-sectional view of a prior art wheel bearing apparatus.
Figure 19:
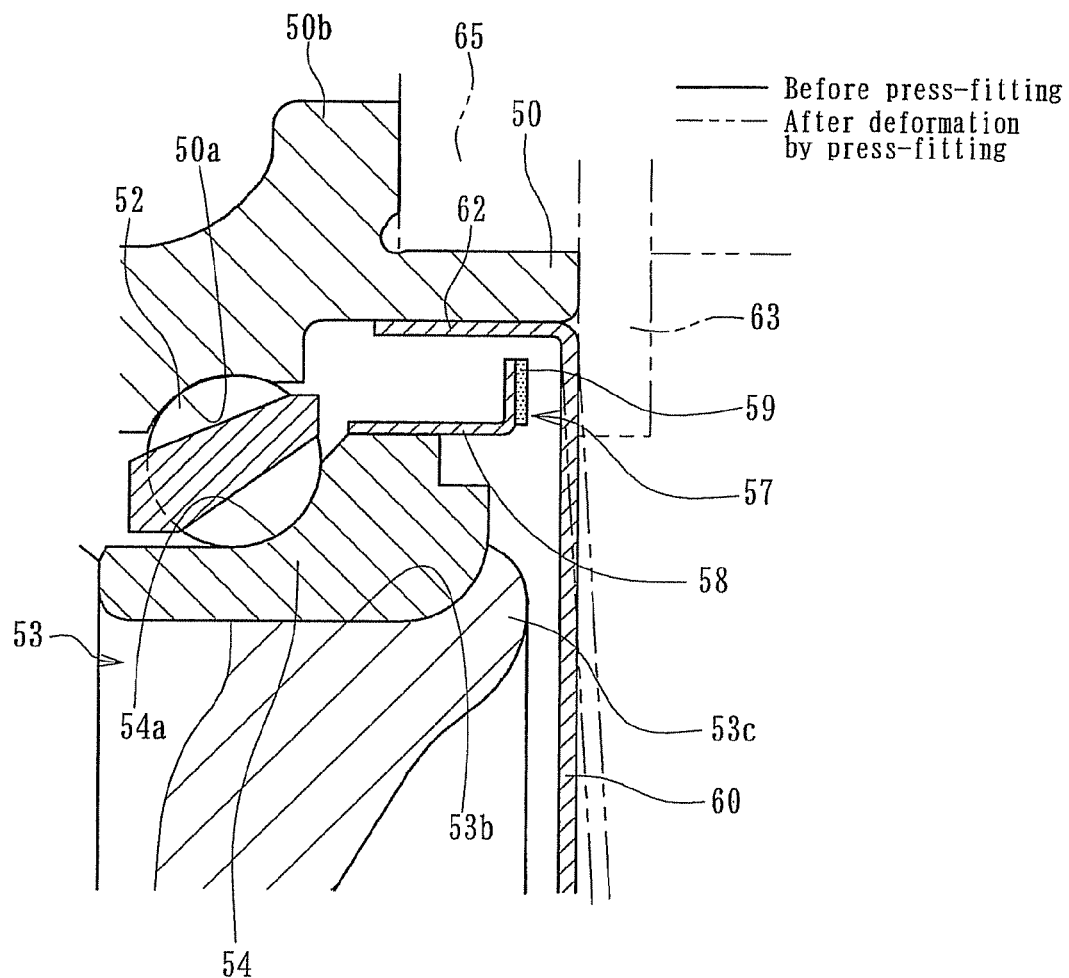
FIG. 19 is a partially enlarged view of a press-fit condition of the cover of FIG. 18.
Figure 20:
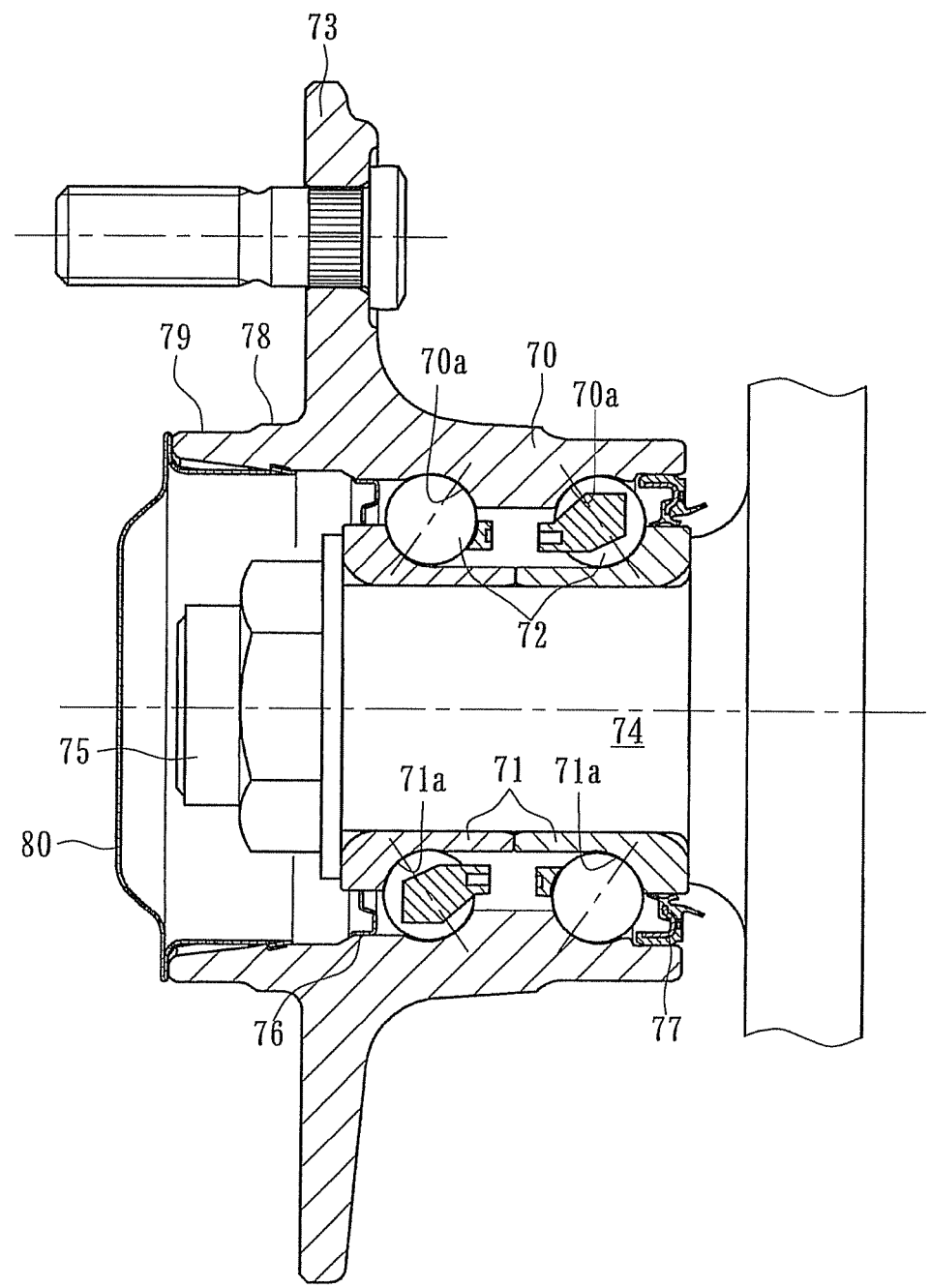
FIG. 20 is a longitudinal-sectional view of another prior art wheel bearing apparatus.
Figure 21:
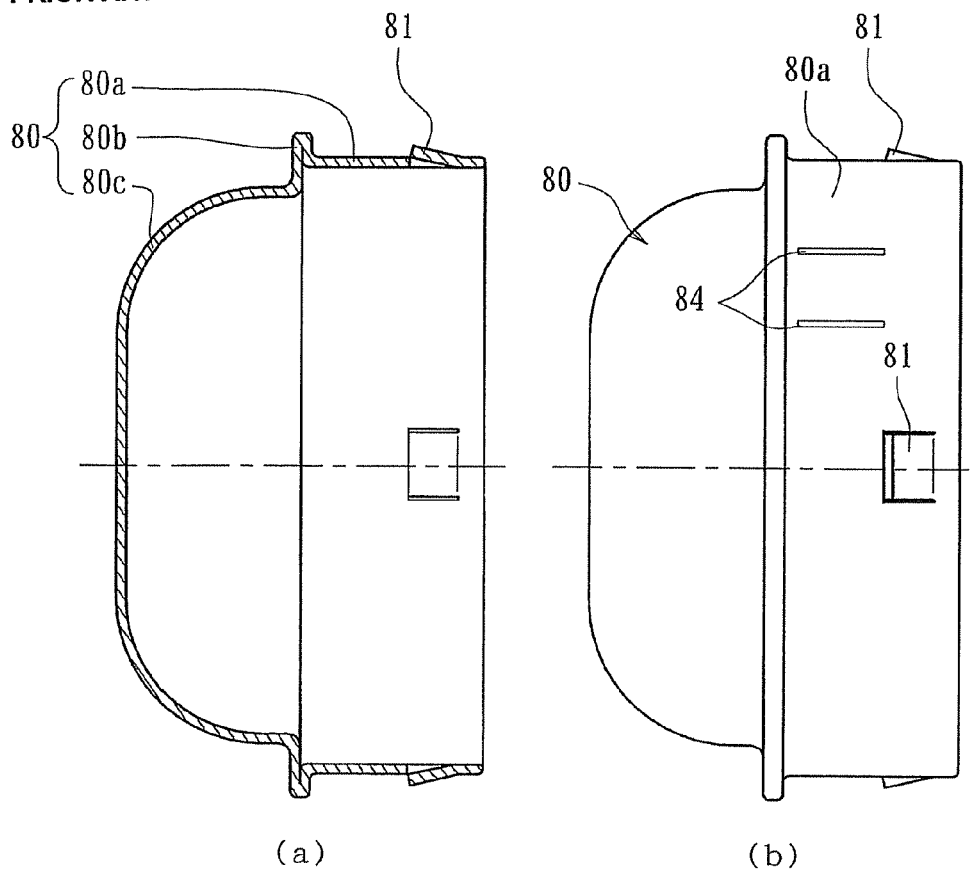
FIG. 21(*a*) is a longitudinal-sectional view of the cap of FIG. 20.
Figure 22:
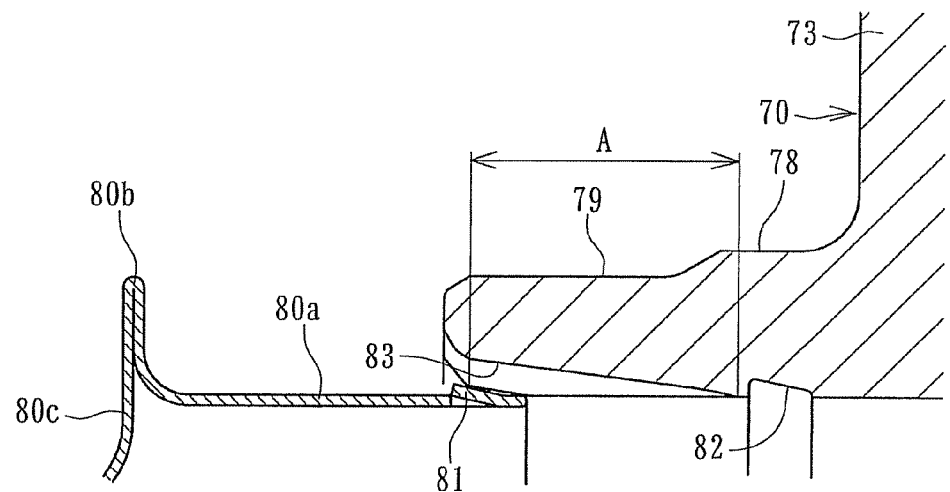
FIG. 22 is an explanatory view of a press-fitting condition of the protecting cover of FIG. 21.

FIG. 15 is a longitudinal-sectional view of a third embodiment of a wheel bearing apparatus. FIG. 16(a) is an explanatory view of a preset of the protecting cover of FIG. 15. FIG. 16(b) is an explanatory view of a preset of the pulser ring of FIG. 15. FIG. 17(a) is an explanatory view of a method for processing the outer member of FIG. 15. FIG. 17(b) is an explanatory view of a method for processing the inner ring of FIG. 15. The same reference numerals are used to designate the same structural elements of the previous embodiments and thus their detailed description will be omitted.

Similar to the previous embodiments, a pulser ring 37 is press-fit onto an inner ring 36. It is press-formed from ferromagnetic steel sheet such as ferritic stainless steel sheet or preserved cold rolled steel sheet. The pulser ring 37 includes an annular supporting member 38 with an L-shaped longitudinal section. The magnetic encoder 14 integrally adhered to the annular supporting member 38.

The annular supporting member 38 has a cylindrical fitting portion 38a press-fit onto the outer circumference and a standing portion 26b extending radially outward from the fitting portion 38a. The magnetic encoder 14 is integrally adhered to the inner-side surface of the standing portion 26b, via vulcanizing adhesion.

A protecting cover 40 is press-fit into the inner circumference of the inner-side end of an outer member 39 to close the inner-side opening of the outer member 39. The protecting cover 40 includes a cylindrical fitting portion 40a press-fit into the inner circumference of the inner-side end of the outer member 39. The disk-shaped shielding portion 27b extends radially inward from the fitting portion 40a, via the radially reducing portion 29. The shielding portion 27b opposes the magnetic encoder 14 via a slight axial gap. The bottom portion 27d extends radially inward from the shielding portion 27b, via the bent portion 27c and covers the inner-side end of the inner member 22.

The outer member 39 is formed with a guiding portion 39a having a step δ on the inner circumference of the outer member 39 at the inner-side end. The inner diameter d4 of the guiding portion 39a is larger than the outer diameter d5 of the fitting portion 40a of the protecting cover 40 (d4>d5). This enables the protecting cover 40 to be preset under a coaxially aligned condition of the protecting cover 40 when the protecting cover 40 is press-fit into the outer member 39, as shown in FIG. 16(a). Thus, it is possible to improve the sealability of the fitting portion while preventing the generation of damage or scratches during the press-fitting operation. Also, this improves the workability during the press-fitting operation.

As shown in FIG. 17(a), a transition portion 41 between the fitting surface 2d of the outer member 39 and the guiding portion 39a of the outer member 39 is formed with a circular-arc longitudinal section having a predetermined radius of curvature R1. The outer raceway surfaces 23a, fitting surface 2d and transitional portion 41 are simultaneously ground by a formed grinding wheel 42. This improves the dimensional accuracy and coaxiality of the protecting cover and the outer member. This further improves the workability during the press-fitting operation of the protecting cover 40.

A guiding portion 36a, having a step δ, is formed on the outer circumference of the end of the inner ring 36, as shown in FIG. 15. An outer diameter D4 of the guiding portion 36a is larger than an outer diameter D0 of the inner ring 36 (D4<D0). This makes it possible to preset the pulser ring 37 under a coaxially aligned condition when the pulser ring 37 is press-fit onto the inner ring 36. Thus, it is possible to improve the sealability of the fitting portion while preventing the generation of damage or scratches during the press-fitting operation of the pulser ring 37. Also, this improves the workability during the press-fitting operation.

In addition, as shown in FIG. 17(b), a transition portion 43, between the outer circumference 5c of the inner ring 36 and the guiding portion 36a of the inner ring 36, is formed with a circular-arc longitudinal section having a radius of curvature R1. The inner raceway surface 5a of the inner ring 36, outer circumference 5c and transitional portion 43 are simultaneously ground by a formed grinding wheel 44. This improves the dimensional accuracy and coaxiality of the pulser ring 37 and the inner ring 36. Thus, this further improves the workability during the press-fitting operation of the pulser ring 37.

The present disclosure can be applied to wheel bearing apparatus for a driven wheel of the inner ring rotation type of a first—third generation structure.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
an outer member integrally formed with double row outer raceway surfaces on its inner circumference;
an inner member including a wheel hub and at least one inner ring, the wheel hub is integrally formed, on its one end, with a wheel mounting flange, a cylindrical portion axially extends from the wheel mounting flange, the inner ring is press fit onto the cylindrical portion of the wheel hub, the wheel hub and the inner ring are formed on their outer circumferences, respectively, with one double row inner raceway surfaces that oppose the double row outer raceway surfaces;
double row rolling elements are freely rollably contained between the inner raceway surfaces and outer raceway surfaces of the inner member and outer member;
a pulser ring is fit onto the outer circumference of the inner ring;
a seal is mounted on the outer-side end of the outer member, a protecting cover is mounted on the inner-side end of the outer member, the seal and protective cover close and seal annular openings formed between the outer member and the inner member at both their ends;
the protecting cover is formed with a cup-shaped configuration by press working a non-magnetic steel sheet; the protective cover further comprises a cylindrical fitting portion, a disk-shaped shielding portion, a stepped portion, and a bottom portion;
the cylindrical fitting portion is press-fit into the inner circumference of the inner-side end of the outer member, the disk-shaped shielding portion extends radially inward from the fitting portion via a radially reducing portion, the inner-side surface of the shielding portion is adapted to be arranged close to or in contact with a rotation speed detecting sensor, and the bottom portion is continuous with the shielding portion via the stepped portion to close the inner-side end of the inner member; and
a full deflection of the side surface of the shielding portion caused by a load same as that applied to the protecting cover when it is press-fit into the outer member is limited to a predetermined value or less.

2. The wheel bearing apparatus of claim 1, wherein the allowable limitation of the full deflection of the shielding portion of the protecting cover is 0.15 mm or less.

3. The wheel bearing apparatus of claim 1, wherein the shielding portion of the protecting cover is formed so that it is inclined toward the outer-side by a predetermined inclined angle (θ).

4. The wheel bearing apparatus of claim 1, wherein the radially reducing portion of the protecting cover has a stepped configuration in its longitudinal section.

5. The wheel bearing apparatus of claim 1, wherein the radially reducing portion of the protecting cover is tapered so that its radius is gradually reduced toward the inner-side direction.

6. The wheel bearing apparatus of claim 1, wherein a sealing member is integrally adhered to the outer circumference of the radially reducing portion of the protecting cover, the sealing member further comprises an annular portion and a projected portion, the annular portion has an outer diameter slightly smaller than an outer diameter of the fitting portion of the protecting cover, the projected portion has an outer diameter larger than that of the fitting portion, and the projected portion is press-fit into the inner circumference of the end of the outer member via a predetermined interference.

7. The wheel bearing apparatus of claim 6, wherein the dimension of the sealing member is set so that it does not project beyond the inner-side surface of the shielding portion of the protecting cover.

8. The wheel bearing apparatus of claim 6, wherein the fitting volume of the projected portion of the sealing member is set so that it is smaller than a volume of an annular space formed between the annular portion of the sealing member and the inner circumference of the outer member under a condition where a press-fitting tool abuts against the sealing member.

9. The wheel bearing apparatus of claim 6, wherein the inner diameter of the end of the fitting portion of the protecting cover is set so that it is smaller than the outer diameter of the inner-side end surface of the sealing member.

10. The wheel bearing apparatus of claim 1, wherein a sheet thickness of the shielding portion of the protecting cover is smaller than a sheet thickness of the other portions.

11. The wheel bearing apparatus of claim 1, wherein the stepped portion recessed from the shielding portion is formed between the shielding portion and the radially reducing portion of the protecting cover.

12. The wheel bearing apparatus of claim 1, wherein a thinned portion is formed between the shielding portion and the radial reducing portion of the protecting cover.

13. The wheel bearing apparatus of claim 1, wherein an inner-side end surface of the outer member slightly projects from a large end surface of the inner ring toward the inner-side.

14. The wheel bearing apparatus of claim 1, wherein the magnetic encoder is arranged so that its detecting surface is flush with the large end surface of the inner ring or it slightly projects from the large end surface of the inner ring toward the inner-side.

15. The wheel bearing apparatus of claim 1, wherein adhesive or liquid sealant is applied on the fitting portion of the protecting cover.

16. The wheel bearing apparatus of claim 1, wherein the sealing member is formed of rubber material having the compression set of physical properties of rubber of 40% or less at 120° C.×70 hours and the TR10 value of −35° C. or less.

17. The wheel bearing apparatus of claim 1, wherein either one of the fitting surfaces of the protecting cover and the outer member is formed with a step ($\delta$) in a radial direction.

18. The wheel bearing apparatus of claim 17, wherein the height of the step ($\delta$) is within a range of 0.15~0.30 mm.

19. The wheel bearing apparatus of claim 17, wherein the step ($\delta$) is formed by press work on the end of the fitting portion of the protecting cover, and an outer diameter (d1) of the step ($\delta$) is smaller than an inner diameter (d0) of the fitting surface of the outer member.

20. The wheel bearing apparatus of claim 17, wherein the end of the fitting portion is formed as a small diameter portion having a diameter smaller than the outer diameter of the fitting portion by the height of the step ($\delta$).

21. The wheel bearing apparatus of claim 17, wherein a width of the step ($\delta$) of the protecting cover is larger than a width of a chamfered portion end of the outer member.

22. The wheel bearing apparatus of claim 17, wherein a guiding portion is formed on the inner circumference of the end of the outer member, and an inner diameter of the guiding portion is larger than an outer diameter of the fitting portion of the protecting cover.

23. The wheel bearing apparatus of claim 22, wherein a transition portion between the fitting surface and the guiding portion of the outer member is formed with a circular-arc longitudinal section having a radius of curvature, and the outer raceway surfaces, fitting surface and transitional portion are simultaneously ground by a formed grinding wheel.

24. The wheel bearing apparatus of claim 1, wherein the pulser ring is formed by press working a steel sheet, the pulser ring comprises an annular supporting member and the magnetic encoder;

the annular supporting member further comprises a cylindrical fitting portion, press-fit onto the outer circumference of the inner ring, and a standing portion radially extending from the cylindrical fitting portion;

the magnetic encoder is integrally adhered to the standing portion by vulcanizing adhesion;

the magnetic encoder is formed of an elastomer with mingled ferritic magnetic powder so that N and S poles are alternately arranged along its circumference;

the magnetic encoder is arranged opposite to the rotation speed detecting sensor, via a predetermined axial gap through the protecting cover, and either one of fitting surfaces of the annular supporting member or the inner ring is formed with a step in a radial direction.

25. The wheel bearing apparatus of claim 24, wherein the step ($\delta$) is formed by press work on the end of the fitting portion of the annular supporting member, and the inner diameter of the step ($\delta$) is larger than the outer diameter of the inner ring.

26. The wheel bearing apparatus of claim 25, wherein a width of the step ($\delta$) of the annular supporting member is larger than a width of the chamfered portion.

27. The wheel bearing apparatus of claim 24, wherein the perpendicularity of the magnetic encoder relative to the fitting portion of the annular supporting member is limited to 0.30 mm or less.

28. The wheel bearing apparatus of claim 24, wherein a guiding portion is formed on the outer circumference of the end of the inner ring, and an outer diameter of the guiding portion is larger than an outer diameter of the inner ring.

29. The wheel bearing apparatus of claim 24, wherein an outer diameter of the fitting portion of the annular supporting member is larger than an inner diameter of the magnetic encoder.

30. The wheel bearing apparatus of claim 28, wherein a transition portion between the outer circumference of the inner ring and the guiding portion of the inner ring is formed with a circular-arc longitudinal section having a radius of curvature, and the inner raceway surface of the inner ring, outer circumference and transitional portion are simultaneously ground by a formed grinding wheel.

\* \* \* \* \*

UNITED STATES PATENT AND TRADEMARK OFFICE
CERTIFICATE OF CORRECTION

| | |
|---|---|
| PATENT NO. | : 8,915,649 B2 |
| APPLICATION NO. | : 14/020819 |
| DATED | : December 23, 2014 |
| INVENTOR(S) | : Makoto Seki et al. |

It is certified that error appears in the above-identified patent and that said Letters Patent is hereby corrected as shown below:

In The Specification

Column 10
Line 30    "0.40-0.80%" should be --0.40~0.80%--
Line 36    "58-64" should be --58~64--
Line 64    "0.40-0.80%" should be --0.40~0.80%--
Line 66    "58-64" should be --58~64--

Column 11
Line 12    "58-64" should be --58~64--

Column 12
Line 1     "(MS SUS 430, etc.)" should be --(JIS SUS 430, etc.)--

Column 14
Line 4     "(MS SUS 430, etc.)" should be --(JIS SUS 430, etc.)--

Column 16
Line 33    "outer circumference Sc" should be --outer circumference 5c--

Signed and Sealed this
Twenty-fourth Day of November, 2015

Michelle K. Lee
*Director of the United States Patent and Trademark Office*